US010710162B2

(12) United States Patent
Teramoto et al.

(10) Patent No.: US 10,710,162 B2
(45) Date of Patent: Jul. 14, 2020

(54) APPARATUS AND METHOD FOR MANUFACTURING METAL NANOPARTICLE DISPERSION, METHOD FOR MANUFACTURING METAL NANOPARTICLE SUPPORT, METAL NANOPARTICLE, METAL NANOPARTICLE DISPERSION, AND METAL NANOPARTICLE SUPPORT

(71) Applicant: NATIONAL INSTITUTE OF ADVANCED INDUSTRIAL SCIENCE AND TECHNOLOGY, Tokyo (JP)

(72) Inventors: Yoshiyuki Teramoto, Ibaraki (JP); Atsushi Ogata, Ibaraki (JP); Akihiko Wakisaka, Ibaraki (JP); Hyun-Ha Kim, Ibaraki (JP)

(73) Assignee: NATIONAL INSTITUTE OF ADVANCED INDUSTRIAL SCIENCE AND TECHNOLOGY, Tokyo (JP)

( * ) Notice: Subject to any disclaimer, the term of this patent is extended or adjusted under 35 U.S.C. 154(b) by 90 days.

(21) Appl. No.: 15/746,159

(22) PCT Filed: Jul. 12, 2016

(86) PCT No.: PCT/JP2016/070577
§ 371 (c)(1),
(2) Date: Jan. 19, 2018

(87) PCT Pub. No.: WO2017/014108
PCT Pub. Date: Jan. 26, 2017

(65) Prior Publication Data
US 2018/0207728 A1    Jul. 26, 2018

(30) Foreign Application Priority Data

Jul. 23, 2015  (JP) ................................ 2015-145986
Sep. 3, 2015   (JP) ................................ 2015-173491

(51) Int. Cl.
*B22F 9/24*       (2006.01)
*B22F 9/08*       (2006.01)
(Continued)

(52) U.S. Cl.
CPC ............ *B22F 9/082* (2013.01); *B22F 1/0018* (2013.01); *B22F 1/0022* (2013.01);
(Continued)

(58) Field of Classification Search
None
See application file for complete search history.

(56) References Cited

U.S. PATENT DOCUMENTS 10,086,353 B2 * 10/2018 Wakisaka ................. B01J 19/08
2006/0201390 A1 *  9/2006 Lahann ................. B82Y 10/00
                                                              106/401
(Continued)

FOREIGN PATENT DOCUMENTS

EP    3061848 A  *  8/2016
EP    3061848 A1    8/2016
(Continued)

OTHER PUBLICATIONS

International Search Report dated Oct. 18, 2016, from International Application No. PCT/JP2016/070577.
(Continued)

*Primary Examiner* — George Wyszomierski
(74) *Attorney, Agent, or Firm* — Meunier Carlin & Curfman LLC

(57) ABSTRACT

To provide an apparatus and method for manufacturing a metal nanoparticle dispersion with which a metal nanoparticle dispersion can be manufactured without using expensive reagents or equipment, and to provide a method for manufacturing a metal nanoparticle support, metal nanoparticles, a metal nanoparticle dispersion, and a metal nano-
(Continued)

particle support. This apparatus for manufacturing a metal nanoparticle dispersion is characterized in comprising: a jetting part for jetting a metal-salt solution or dispersion in which a metal salt has been dissolved or dispersed in a first liquid; a voltage-impressing part for applying a voltage to the jetting part and electrifying the metal-salt solution or dispersion; and a potential-difference-forming means for forming a potential difference between a second liquid in which the metal-salt solution or dispersion has been dispersed and the electrified metal-salt solution or dispersion, causing droplets of the metal-salt solution or dispersion to be jetted from the jetting part, and causing the second liquid to attract the droplets.

6 Claims, 14 Drawing Sheets

(51) Int. Cl.
*B82Y 30/00* (2011.01)
*B82Y 40/00* (2011.01)
*B22F 1/00* (2006.01)

(52) U.S. Cl.
CPC ............ *B22F 1/0044* (2013.01); *B82Y 30/00* (2013.01); *B82Y 40/00* (2013.01); *B22F 9/24* (2013.01); *B22F 2009/0836* (2013.01); *B22F 2301/255* (2013.01); *B22F 2304/054* (2013.01); *B22F 2999/00* (2013.01)

(56) References Cited

U.S. PATENT DOCUMENTS

| | | | |
|---|---|---|---|
| 2009/0178933 A1* | 7/2009 | Zeng | C25B 1/00 205/766 |
| 2016/0300703 A1 | 10/2016 | Hasegawa et al. | |

FOREIGN PATENT DOCUMENTS

| | | |
|---|---|---|
| JP | 11-106806 A | 4/1999 |
| JP | 2007-520326 A | 7/2007 |
| JP | 2015-511274 A | 4/2015 |
| WO | 2005019096 A1 | 3/2005 |
| WO | 2009/014165 A1 | 1/2009 |
| WO | 2012173262 A1 | 12/2012 |
| WO | 2013186740 A1 | 12/2013 |
| WO | 2014/084015 A1 | 6/2014 |
| WO | 2015/060342 A1 | 4/2015 |

OTHER PUBLICATIONS

Written Opinion dated Oct. 18, 2016, from International Application No. PCT/JP2016/070577.
Gold Nanotechnology: Fundamentals and Applications, Chapter 9, p. 116-126 (2009).
H. Tsunoyama et al., "Microfluidic Synthesis and Catalytic Application of PVP-Stabilized ~1 nm Gold Clusters", Langmuir, vol. 24, No. 20, 2008, p. 11327-11330.

* cited by examiner

APPARATUS AND METHOD FOR MANUFACTURING METAL NANOPARTICLE DISPERSION, METHOD FOR MANUFACTURING METAL NANOPARTICLE SUPPORT, METAL NANOPARTICLE, METAL NANOPARTICLE DISPERSION, AND METAL NANOPARTICLE SUPPORT

TECHNICAL FIELD

The present invention relates to a new apparatus and method for manufacturing a metal nanoparticle dispersion liquid using an electrospray method, a method for manufacturing a metal nanoparticle support, metal nanoparticles, a metal nanoparticle dispersion liquid, and a metal nanoparticle support.

BACKGROUND ART

Nanomaterials have been used in a wide range of fields such as semiconductors, biotechnology, and catalysts. In particular, metal nanoparticles have been applied to various usages. Metal particles having a particle diameter on the nanometer order (particle diameter of less than 10 nm) are called metal nanoparticles, and as compared with bulk substances, in such metal nanoparticles, surface sites of a corner, an edge, and a terrace having high coordinative nonsaturability increase, so that the proportion of atoms present on the surface increases, and thus high activity in the reaction process is exhibited in many cases. For example, as one of use applications, it is known that a catalyst in which gold nanoparticles are fixed on the surface of a titanium oxide exhibits high CO oxidation characteristics at normal temperature. Therefore, there is a demand for a method for obtaining metal nanoparticles without impairing characteristics required according to use application.

Herein, there are generally two types of method for manufacturing metal nanoparticles: a breakdown method based on a physical technique and a buildup method based on a chemical technique. Of these, the buildup method does not require as large dedicated machines as those for the breakdown method, and accordingly, it is widely employed. As the buildup method, a method is known in which metal ions are chemically reduced in a solvent.

As the buildup method, for example, numerous methods for synthesizing silver nanoparticles in an aqueous solution have been reviewed, and typically, the Carey Lea method has been reviewed in which an aqueous solution of silver nitrate is added into an aqueous solution of a ferrous salt and a citric acid salt. In these methods, a dispersion liquid containing silver nanoparticles having a particle diameter on the order of 10 nm can be obtained. This dispersion liquid is excellent in high dispersion stability and narrow particle size distribution. Further, it is known that properties of metal nanoparticle dispersion liquids such as a silver nanoparticle dispersion liquid are greatly changed by controlling the particle diameters, particle size distribution, shapes, and the like of the metal nanoparticles.

One example of the method for manufacturing such metal nanoparticles includes a manufacturing method in which, in order to control the shapes and particle diameters of silver nanoparticles (silver powder), a slurry containing an amine complex of a silver salt and an amine complex of a heavy metal salt acting as a habit modifier during a reduction reaction, is mixed at once with a solution containing potassium sulfite used as a reducing agent and a gelatin used as a protective colloid, the amine complex of the silver salt is reduced, and silver nanoparticles thus generated are collected. (For example, see Patent Document 1.)

As a simple method of supporting gold nanoparticles on the surface of a basic or amphoteric metal oxide such as a titanium oxide, a deposition precipitation method is known. However, in the deposition precipitation method, if an oxide is not an oxide in which an isoelectric point is pH of about 5 or more, the gold nanoparticles cannot be supported. Therefore, an oxide support not corresponding to the above-described oxide, such as silica, zeolite, or clay, or a non-oxide support such as activated carbon or a porous resin cannot support the gold nanoparticles, and a problem arises in that there is limitation on use application according to selection of a constituent material for a support (for example, see Non-Patent Document 1).

Further, as a method of supporting gold nanoparticles on the surface of a support, a solid phase mixing method and a grafting method are exemplified. In these methods, the gold nanoparticles can be supported on the surface of activated carbon. However, in these methods, an expensive reagent such as gold acetylacetonato and expensive equipment such as a vacuum apparatus are necessary so that a problem arises in that the manufacturing cost increases.

Further, as the method of supporting gold nanoparticles on the surface of a support, a colloidal fixation method is exemplified. In the colloidal fixation method, there is no limitation on a support material as described above, and the metal nanoparticles can also be supported on the activated carbon or the like. In the colloidal fixation method, in order to prevent aggregation of gold nanoparticles in colloid, or the like, it is necessary to protect the gold nanoparticles with a protecting agent such as polyvinylpyrrolidone (PVP), support the gold nanoparticles on a support, and then remove the protecting agent by washing and calcination. However, in a case where a support is a material that does not endure a high temperature (about 200° C. to 300° C.), such as activated carbon, since the protecting agent is removed only by washing, the protecting agent adhering to the surfaces of the gold nanoparticles cannot be sufficiently removed, and a problem arises in that activity of the gold nanoparticles as a catalyst deteriorates.

As an example of the method for synthesizing a metal nanoparticle dispersion liquid, in order to suppress the self-assembly and to speed up the reduction reaction, a method for synthesizing a gold nanoparticle dispersion liquid has been proposed in which a chloroauric acid ($HAuCl_4$) solution is mixed with a reducing agent (sodium borohydride, citric acid, ascorbic acid, or the like) by using a microreactor (micromixer) so that gold ions are reduced to generate gold atoms (for example, see Non-Patent Document 2). The microreactor used in the synthesis method is configured such that liquids pass through multiple tubular flow paths and then merge to mix with one another, and such a microreactor makes it possible to decrease the volume of a reaction solution to be mixed and to increase the mixing speed. For this reason, the microreactor enables highly efficient mixing and high-speed reduction reaction, and the self-assembly of gold atoms can be suppressed by a dispersant to be added to the microreactor.

However, the above-described one example of the synthesis method can only roughly control properties of metal nanoparticles, such as particle diameters, particle size distribution, shapes, and the like, by utilizing the properties of the chloroauric acid solution and the reducing agent, the structure of the microreactor, and the like, and thus, it is difficult to precisely control the properties of metal nanoparticles. For this reason, it is difficult to obtain metal nanoparticles having desired properties. Since the inner diameters of tubular flow paths of a microreactor are just about 100 μm in many cases, a reaction product adheres to inner walls of such tubular flow paths, and a problem arises in that the reaction product cannot be efficiently generated when the tubular flow paths are clogged and it is difficult to perform mass production.

Further, as another example of the method for synthesizing a metal nanoparticle dispersion liquid, in order to precisely control properties of metal nanoparticles and to efficiently generate the metal nanoparticles, a method for synthesizing a metal nanoparticle dispersion liquid has been proposed in which while a strong electric field is generated between two electrospray nozzles which are disposed to face each other in the air by applying positive and negative potentials, respectively, to the two electrospray nozzles, solutions of a metal salt and a reducing agent are respectively supplied to the two electrospray nozzles at constant flow rates, and droplets respectively charged to the positive and negative potentials are sprayed from the electrospray nozzles so that these droplets collide and mix with each other in the air by an electrostatic interaction (for example, see Patent Document 2).

Furthermore, the above-described other example of the synthesis method has such a problem that droplets charged to the positive and negative potentials do not efficiently collide with each other because the sprayed droplets diffuse in the air. Further, even when the droplets collide with each other, most of the reaction products made of the droplets by collision, either diffuse in the air or adhere to the wall surface. This results in a problem that the yield of the reaction product is low. Further, in a case where spraying is performed in a liquid, it is necessary to select a solvent that does not have an influence on the liquid-phase conductivity, and thus there is a limitation on the solvent to be used. Further, a problem arises in that the droplets enlarge as the sprayed amount is increased, and this results in an enlargement of sizes of metal nanoparticles.

Patent Document 1: Japanese Unexamined Patent Application, Publication No. H11-106806
Patent Document 2: PCT International Publication No. WO2012/173262
Non-Patent Document 1: Gold Nanotechnology: Fundamentals and Applications, Chapter 9, supervised by Masatake Haruta, CMC Publishing CO., LTD., p. 116-126 (2009)
Non-Patent Document 2: H. Tsunoyama, and two others, "Microfluidic Synthesis and Catalytic Application of PVP—Stabilized~1 nm Gold Clusters," Langmuir, (U.S.), 2008, Vol. 24, Issue number 20, p. 11327-p. 11330

DISCLOSURE OF THE INVENTION

Problems to be Solved by the Invention

An object of the present invention is to provide an apparatus and method for manufacturing a metal nanoparticle dispersion liquid with which the various problems in the related arts can be solved and a metal nanoparticle dispersion liquid can be manufactured without using an expensive reagent or expensive equipment with a high speed and high efficiency, and a method for manufacturing a metal nanoparticle support, metal nanoparticles, a metal nanoparticle dispersion liquid, and a metal nanoparticle support. Further, another object of the present invention is to provide an apparatus and method for manufacturing a metal nanoparticle dispersion liquid with which a metal nanoparticle dispersion liquid can be manufactured without secondarily using a protecting agent with a high speed and high efficiency.

Means for Solving the Problems

Means for solving the above-described problems are as follows. That is,
<1> An apparatus for manufacturing a metal nanoparticle dispersion liquid, including: a spraying unit spraying a metal-salt dissolution or dispersion liquid obtained by dissolving or dispersing a metal salt in a first liquid; a voltage applying unit applying a voltage to the spraying unit to charge the metal-salt dissolution or dispersion liquid; and a potential difference forming means forming a potential difference between a second liquid in which the metal-salt dissolution or dispersion liquid is dispersed and the charged metal-salt dissolution or dispersion liquid, spraying the metal-salt dissolution or dispersion liquid as droplets from the spraying unit, and drawing the droplets to the second liquid.
<2> The apparatus for manufacturing a metal nanoparticle dispersion liquid described in <1>, in which the spraying unit has a gas spraying section assisting the spraying of the metal-salt dissolution or dispersion liquid.
<3> The apparatus for manufacturing a metal nanoparticle dispersion liquid described in <1> or <2>, further including a light irradiating means irradiating droplets moving toward the second liquid from the spraying unit with light.
<4> The apparatus for manufacturing a metal nanoparticle dispersion liquid described in any one of <1> to <3>, in which diameters of the sprayed droplets are 0.1 μm to 100 μm.
<5> The apparatus for manufacturing a metal nanoparticle dispersion liquid described in any one of <1> to <4>, in which a potential difference between the metal-salt dissolution or dispersion liquid and the second liquid is 0.3 kV to 30 kV when expressed as an absolute value.
<6> The apparatus for manufacturing a metal nanoparticle dispersion liquid described in any one of <1> to <5>, in which a speed of feeding the metal-salt dissolution or dispersion liquid to the spraying unit is 0.001 mL/min to 0.1 mL/min.
<7> The apparatus for manufacturing a metal nanoparticle dispersion liquid described in any one of <1> to <6>, in which the first liquid and the second liquid are miscible with each other.
<8> The apparatus for manufacturing a metal nanoparticle dispersion liquid described in any one of <3> to <7>, in which the light irradiating means radiates light having a wavelength of 100 nm to 1,000 nm.
<9> A method for manufacturing a metal nanoparticle dispersion liquid, including: a liquid feeding step of feeding a metal-salt dissolution or dispersion liquid obtained by dissolving or dispersing a metal salt in a first liquid to a spraying unit; a voltage applying step of applying a voltage to the spraying unit to charge the metal-salt dissolution or dispersion liquid; and a potential difference forming step of forming a potential difference between a second liquid in which the metal-salt dissolution or dispersion liquid is dispersed and the charged metal-salt dissolution or dispersion liquid, spraying the metal-salt dissolution or dispersion liquid as droplets from the spraying unit, and drawing the droplets to the second liquid.
<10> The method for manufacturing a metal nanoparticle dispersion liquid described in <9>, in which the potential difference forming step is to concurrently use gas flow in the spraying of the metal-salt dissolution or dispersion liquid by the spraying unit.

<11> The method for manufacturing a metal nanoparticle dispersion liquid described in <9> or <10>, in which the second liquid contains a reducing agent.

<12> The method for manufacturing a metal nanoparticle dispersion liquid described in any one of <9> to <11>, in which the second liquid contains a dispersant.

<13> The method for manufacturing a metal nanoparticle dispersion liquid described in any one of <9> to <12>, further including a light irradiating step of irradiating the droplets moving toward the second liquid from the spraying unit with light.

<14> A method for manufacturing a metal nanoparticle support, including a step of dispersing a support supporting metal nanoparticles into the metal nanoparticle dispersion liquid manufactured by the method for manufacturing a metal nanoparticle dispersion liquid described in any one of <9> to <13>.

<15> Metal nanoparticles having a particle diameter of less than 10 nm and formed only from metal.

<16> A metal nanoparticle dispersion liquid containing the metal nanoparticles described in <15> and a second liquid in which a metal-salt dissolution or dispersion liquid is dispersed.

<17> A metal nanoparticle support supporting the metal nanoparticles described in <15>.

Effects of the Invention

According to the present invention, it is possible to provide an apparatus and method for manufacturing a metal nanoparticle dispersion liquid with which the various problems in the related arts can be solved and a metal nanoparticle dispersion liquid can be manufactured without using an expensive reagent or expensive equipment with a high speed and high efficiency, and a method for manufacturing a metal nanoparticle support, metal nanoparticles, a metal nanoparticle dispersion liquid, and a metal nanoparticle support. Further, it is possible to provide an apparatus and method for manufacturing a metal nanoparticle dispersion liquid with which a metal nanoparticle dispersion liquid can be manufactured without using a protecting agent according to secondary manufacturing conditions with a high speed and high efficiency.

PREFERRED MODE FOR CARRYING OUT THE INVENTION

First Embodiment

A first embodiment of a method and apparatus for manufacturing metal nanoparticles of the present invention will be described below.

(Regarding Apparatus for Manufacturing Metal Nanoparticles)

Figure 1:
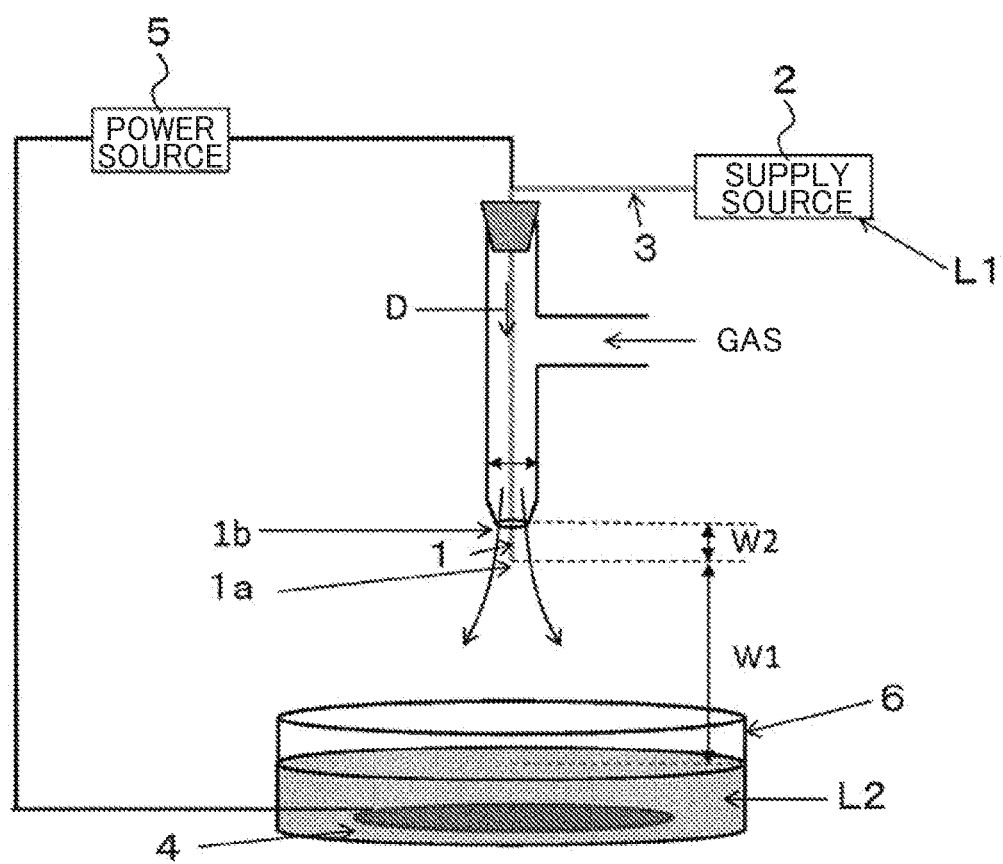
FIG. 1 is a schematic diagram illustrating a first embodiment of an apparatus for manufacturing metal nanoparticles of the present invention.

First, an apparatus for manufacturing metal nanoparticles according to the first embodiment will be described. As illustrated in FIG. 1, the manufacturing apparatus is configured to manufacture a dispersion, such as a dispersion liquid containing a reaction product of a metal-salt dissolution or dispersion liquid L1 and a second liquid L2, by using the metal-salt dissolution or dispersion liquid L1 and the second liquid L2. A reaction product to be obtained by this manufacturing apparatus is metal nanoparticles. The manufacturing apparatus is configured to manufacture metal nanoparticles. As the metal-salt dissolution or dispersion liquid L1 used in manufacturing, one obtained by dissolving or dispersing a metal salt in a first liquid is used. As the second liquid L2 used in manufacturing, a liquid obtained by dissolving a reducing agent is preferably used although it is not essential. The first liquid and the second liquid L2 may be favorably miscible with each other.

A spraying unit of the manufacturing apparatus has an electrospray nozzle (hereinafter, referred to as the "nozzle") 1 configured such that the metal-salt dissolution or dispersion liquid L1 can be electrostatically sprayed. The metal-salt dissolution or dispersion liquid L1 is sprayed in a state of droplets from a spray port 1a of the nozzle 1 as indicated by an arrow D. Further, the spraying unit of the manufacturing apparatus has a supply source 2 supplying the metal-salt dissolution or dispersion liquid L1. The nozzle 1 is connected to the supply source 2 through a supply pipe 3.

The manufacturing apparatus has a container 6 and an electrode 4 which are spaced away from the spray port 1a of the nozzle 1. In FIG. 1, a liquid surface of the second liquid L2 is located at a position apart from the spray port 1a of the nozzle 1 by W1, and the electrode 4 which is disposed on a bottom of the container 6 accommodating the second liquid L2 faces the spray port 1a of the nozzle 1 with a space obtained by adding the height of the liquid surface to W1. A distance between the spray port 1a of the nozzle 1 and the electrode 4 is associated with an electric field strength and is further associated with the fragmentation process of droplets generated by the electrospray. Therefore, it is preferable to optimize the distance. The electrode 4 is formed in a substantially plate shape. However, the present invention is not limited thereto, and the shape of the electrode 4 may be a substantially ring shape, a substantially cylindrical shape, a substantially mesh shape, a substantially rod shape, a substantially spherical shape, a substantially hemispherical shape, or the like as long as an electrostatic field can be formed between the nozzle 1 and the electrode 4 as described later. For example, the spray port 1a of the nozzle 1 is preferably oriented so as to spray the metal-salt dissolution or dispersion liquid L1 in a direction perpendicular to a flat surface of the plate-shaped electrode 4.

The manufacturing apparatus has a power source 5 electrically connected to each of the nozzle 1 and the electrode 4. In particular, the power source 5 is preferably a high-voltage power source. The power source 5 is configured to apply a positive potential to the nozzle 1 and apply a negative potential to the electrode 4. However, the present invention is not limited thereto, and the power source 5 may alternatively be configured to apply a negative potential to the nozzle 1 and apply a positive potential to the electrode 4.

The spraying unit of the manufacturing apparatus has a gas outflow port 1b at an upper part of the nozzle 1. The supply pipe 3 which is connected to the nozzle 1 is also provided at the center portion of a pipe line for the gas, and the gas outflow port 1b at a tip end of the pipe line for the gas is located at the upper part by a distance W2 apart from the spray port 1a at the tip end of the nozzle 1. The W2 is preferably about 2 mm. The size of the gas outflow port is preferably a diameter of 2 mm to 20 mm. An outflow gas is preferably air, nitrogen, oxygen, carbon dioxide, sulfur hexafluoride ($SF_6$), or a mixed gas thereof. A gas flow rate is preferably from 0 L/min to 10 L/min.

A collecting unit of the manufacturing apparatus is provided with the container 6 having a cavity formed therein. The container 6 is configured to be capable of hermetically sealing the inside at times other than the manufacturing of the metal nanoparticles. However, the present invention is not limited thereto, and the container 6 may be configured to open upward through an opening. The container 6 accommodates the second liquid L2 therein.

Figure 2:
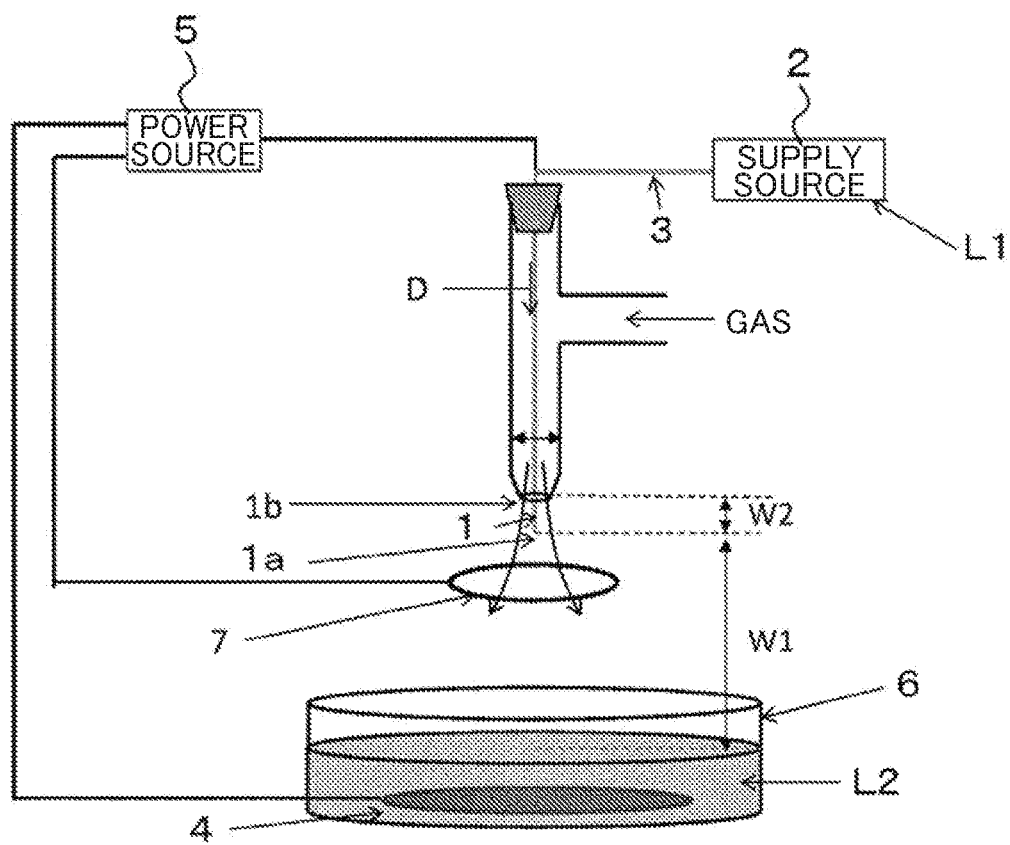
FIG. 2 is a schematic diagram illustrating a modified example of the first embodiment of the apparatus for manufacturing metal nanoparticles of the present invention.

Further, the electrode 4 is disposed in the liquid phase, and in the exemplary embodiment of FIG. 1, the electrode 4 is disposed to be in contact with the bottom of the container 6. However, the present invention is not limited thereto, and various design changes may be conducted. For example, the electrode 4 may be disposed apart from the bottom of the container 6 with a space. In a case where the electrode 4 is formed in a substantially ring shape or a substantially cylindrical shape, the electrode 4 may be disposed along the circumferential direction of the container 6. Further, the present invention is not limited to a case where spraying is performed by applying a potential difference between the nozzle 1 and the electrode 4, but as in the modified example of the metal nanoparticle manufacturing apparatus according to the first embodiment illustrated in FIG. 2, an electrode 7 having a ring shape or the like may be provided between the nozzle 1 and the container 6, and spraying may be performed by applying a potential difference between the electrode 7 and the electrode 4 at the bottom of the container.

(Regarding Method for Manufacturing Metal Nanoparticles)

The method for manufacturing metal nanoparticles according to the present embodiment will be described. A metal salt is dissolved or dispersed in the first liquid. As the second liquid L2, those obtained by dissolving a reducing agent are preferable. The second liquid phase is disposed inside the container 6. The spray port 1a of the nozzle 1 is disposed at an upper part of the phase interface of the second liquid L2, and the electrode 4 is disposed in the phase of the second liquid L2. The gas flow rate is adjusted to an arbitrary value from 0 L/min to 10 L/min. The power source 5 applies a positive potential to the nozzle 1 and applies a negative potential to the electrode 4, thereby generating a potential difference between the nozzle 1 and the electrode 4. At this time, an electrostatic field is formed between the nozzle 1 and the electrode 4. Alternatively, the power source 5 may apply a negative potential to the nozzle 1 and apply a positive potential to the electrode 4, thereby generating a potential difference between the nozzle 1 and the electrode 4.

In this state, the metal-salt dissolution or dispersion liquid L1 is sprayed in a state of droplets from the spray port 1a of the nozzle 1. The droplets, which have been in a charged state, move toward the second liquid phase according to an electric field gradient and reach the interface with the second liquid phase. Herein, the sizes of the droplets may be controlled by adjusting at least one of the surface tension, the ionic strength, the relative permittivity of the metal-salt dissolution or dispersion liquid L1, the potential difference between the nozzle 1 and the electrode 4, and the gas flow rate.

Next, since the first liquid and the second liquid L2 are preferably miscible with each other, the droplets formed from the metal-salt dissolution or dispersion liquid L1 in which a metal salt is dissolved or dispersed in the first liquid mix and react with the second liquid L2. Further, the metal salt dissolved or dispersed in the metal-salt dissolution or dispersion liquid L1 reacts with the second liquid L2 (the reducing agent in the case of adding a reducing agent into the second liquid L2) and the reaction product is dispersed in the second liquid phase. As a result, metal nanoparticles as the reaction product can be obtained. Thereafter, the reaction product can also be collected from the dispersion liquid obtained in the second liquid phase. For example, the second liquid phase is extracted from the container 6, and the dispersion liquid obtained in the second liquid phase is centrifuged to fractionate the reaction product. The reaction product thus fractionated may be collected.

Furthermore, preferable configurations of the present embodiment will be described.

(Regarding Raw Material Substance)

The raw material substance is a metal salt. The metal salt is favorably, for example, a salt of or a double salt of platinum, gold, silver, copper, tin, nickel, iron, palladium, zinc, cobalt, tungsten, ruthenium, indium, molybdenum, or the like, a complex compound thereof, or the like, or a mixture of two or more kinds thereof. The salt is favorably a nitrate, a sulfate, a chloride, or the like.

In order to decrease the surface tension of liquid droplet sprayed from the nozzle 1, the first liquid may contain a lower alcohol having 1 to 3 carbon atoms such as methanol, ethanol, or isopropyl alcohol; a ketone such as acetone or methyl ethyl ketone; or a mixture of two or more kinds thereof. Further, the concentration of the metal salt in the metal-salt dissolution or dispersion liquid L1 or the second liquid L2 can be appropriately adjusted in accordance with the solubility of a compound from which the metal ions are derived, the usage of the metal nanoparticle dispersion liquid, and the like. For example, the concentration of the metal salt is preferably within a range of 0.01 mol/L or more and 5 mol/L or less.

(Regarding Reducing Agent)

As the reducing agent, an optimal reducing agent may be selected which is suitable for metal ion species to be reduced. The reducing agent is favorably, for example, hydroxymethanesulfinic acid, thioglycolic acid, sulfurous acid, or a salt thereof such as a sodium salt, a potassium salt, or an ammonium salt thereof, ascorbic acid, citric acid, sodium hydrosulfite, thiourea, dithiothreitol, a hydrazine, a formaldehyde, a boron hydride, or a mixture of two or more kinds thereof.

The hydrazine is favorably, for example, hydrazine, a hydrazine hydrate, a hydrazine salt, a hydrazine substituent derivative or a salt thereof. Specific examples thereof include a hydrazine hydrate, hydrazine monohydrochloride, hydrazine dihydrochloride, hydrazine sulfate, hydrazine bromate, hydrazine carbonate, methylhydrazine, phenylhydrazine, tert-butylhydrazine hydrochloride, and carbohydrazide.

The formaldehyde is favorably, for example, formaldehyde, paraformaldehyde, or the like, or a mixture of two or more kinds thereof. The boron hydride refers to a reducing compound having a boron-hydrogen bond, and specific examples thereof may include sodium borohydride, potassium borohydride, lithium borohydride, sodium cyanotrihydroborate, lithium triethylborohydride, tetrahydrofuran-borane complex, dimethylamine-borane complex, diphenylamine-borane complex, and pyridine-borane complex. In particular, the reducing agent is preferably ascorbic acid or a hydrazine.

Further, the amount of the reducing agent added can be appropriately adjusted in accordance with the type of the reducing agent, the concentration of the metal salt in the metal-salt dissolution or dispersion liquid L1 or the second liquid L2, and the like. For example, the amount of the reducing agent added is preferably within a range of 1 to 2 times the chemical equivalent (stoichiometric amount, stoichiometry). When the amount of the reducing agent added is less than the chemical equivalent(s), the reduction reaction for the metal ions may not proceed sufficiently. On the other hand, even if the amount of the reducing agent added exceeds 2 times the chemical equivalent, there may be no problems, but the cost will increase.

(Regarding First Liquid and Second Liquid L2)

The preferable configurations of the first liquid and the second liquid L2 will be described below. The first liquid and the second liquid L2 are favorably aqueous or aqueous solution systems miscible with each other. For example, solvents used in the first liquid and the second liquid L2 are favorably water, ethanol, N,N-dimethylformamide (DMF), acetone, or a mixture of two or more kinds thereof. In particular, the first liquid and the second liquid L2 are favorably water or an aqueous solution of water with an aqueous solvent such as ethanol, DMF, or acetone. Further, the solvents used in the first liquid and the second liquid L2 are preferably the same type.

(Regarding Dispersant)

The second liquid L2 may contain a dispersant in a state of being dissolved or dispersed as an auxiliary agent, and particularly, an aqueous solution obtained by using water as a base liquid of the second liquid L2 and dissolving or dispersing the dispersant in the water may be used. Further, in order to decrease the interface tension and the solvent viscosity, the second liquid L2 may contain a lower alcohol having 1 to 3 carbon atoms such as methanol, ethanol, or isopropyl alcohol, a glycol ether solvent thereof, or a mixture of two or more kinds thereof.

As the dispersant, a polymer stabilizer such as polyvinylpyrrolidone, citric acid, or ascorbic acid, or a mixture of two or more kinds thereof is preferable.

A surfactant is favorably a nonionic surfactant, an anionic surfactant, a cationic surfactant, an amphoteric surfactant, or the like.

The anionic surfactant is favorably, for example, one having a sulfone group such as an α-olefinsulfonic acid salt, an alkylbenzenesulfonic acid salt, a paraffin sulfonic acid salt, an α-sulfo fatty acid salt, or an α-sulfo fatty acid alkyl ester salt; one having a sulfuric acid ester group such as a higher alcohol sulfuric acid ester salt or a polyoxyethylene alkyl (or alkenyl) ether sulfuric acid ester salt; a mixture of two or more kinds thereof.

The cationic surfactant is favorably, for example, a monoalkyltrimethylammonium salt, a dialkyldimethylammonium salt, a monoalkylamine acetic acid salt, a dialkylamine acetic acid salt, an alkylimidazoline quaternary salt, or the like, or a mixture of two or more kinds thereof. Incidentally, the number of carbon atoms of each alkyl group is preferably 8 to 24.

The amphoteric surfactant is favorably, for example, alkyl betaine, fatty acid amide propyl betaine, 2-alkyl-N-carboxymethyl-N-hydroxyethylimidazolinium betaine, alkyldiethylenetriaminoacetic acid, dialkyldiethylenetriaminoacetic acid, alkylamine oxide, or the like, or a mixture of two or more kinds thereof.

In particular, from the viewpoint that it is possible to stabilize a metal nanoparticle dispersion liquid, a nonionic surfactant is preferably used as a surfactant. The nonionic surfactant is favorably a fatty acid ester of an alcohol or of an alkylene oxide adduct of an alcohol, a fatty acid ester of a phenol or of an alkylene oxide adduct of a phenol, an alkylene oxide adduct of a phenol or of an alcohol having 8 to 24 carbon atoms, a polymer of ethylene oxide and/or propylene oxide (pluronic type nonionic surfactant), an alkylene oxide adduct of an alkylamine, an alkylene oxide adduct of a fatty acid amide, a fatty acid amide of an alkanolamine, or the like, or a mixture of two or more kinds thereof.

Further, from the viewpoint that it is possible to further stabilize a metal nanoparticle dispersion liquid, the nonionic surfactant is favorably a fatty acid ester of an alcohol or of an alkylene oxide adduct of an alcohol, a fatty acid ester of a phenol or of an alkylene oxide adduct of a phenol, an alkylene oxide adduct of a phenol or of an alcohol having 8 to 24 carbon atoms, or a mixture of two or more kinds thereof. In particular, the nonionic surfactant is preferably a nonionic surfactant made of a fatty acid ester of an alcohol or of an alkylene oxide adduct of an alcohol or a fatty acid ester of a phenol or of an alkylene oxide adduct of a phenol, or a nonionic surfactant made of at least two or more kinds thereof. Further, the nonionic surfactant is more preferably a fatty acid ester of an alcohol or of an alkylene oxide adduct of an alcohol.

Incidentally, the phenols each refer to an aromatic ring bonded to a hydroxy group. Examples of the phenols include phenol, mono-, di-, or tristyrenated phenols, alkylphenols, mono-, di-, or tristyrenated alkylphenols. The number of carbon atoms of each alkyl group can be set to 1 to 12, and the number of bonds to the aromatic ring can be set to 1 to 3.

The alkylene oxide is favorably alkylene oxide having 2 to 3 carbon atoms. In particular, from the viewpoint that it is possible to further stabilize a metal nanoparticle dispersion liquid, the alkylene oxide is preferably ethylene oxide or propylene oxide.

For example, the alcohols in the fatty acid ester of an alcohol or of an alkylene oxide adduct of an alcohol may be an alcohol having 1 to 24 carbon atoms and having a valence of 1 to 6. From the viewpoint that it is possible to further stabilize a metal nanoparticle dispersion liquid, these alcohols are preferably an alcohol having 3 to 12 carbon atoms and having a valence of 2 to 6. Furthermore, these alcohols more preferably have 3 to 6 carbon atoms.

Examples of the alcohols include sorbitan, sugar alcohols, and sugars. Among these, examples of the sugar alcohols include glycerin, erythritol, threitol, arabitol, xylitol, pentaerythritol, ribitol, iditol, dulcitol, sorbitol, and mannitol. Further, examples of the sugars include monosaccharides such as glucose, erythrose, arabinose, mannose, galactose, and fructose, and disaccharides such as sucrose and trehalose. From the viewpoint that it is possible to further stabilize a metal nanoparticle dispersion liquid, such an alcohol is favorably sorbitan, glycerin, pentaerythritol, sorbitol, or sucrose. Furthermore, the alcohol is preferably sorbitan, glycerin, or sorbitol.

The fatty acid is favorably, for example, a fatty acid having 8 to 22 carbon atoms. In particular, from the viewpoint that it is possible to further stabilize a metal nanoparticle dispersion liquid, the fatty acid is preferably a fatty acid having 12 to 18 carbon atoms. Such a fatty acid is favorably dodecanoic acid, tetradecanoic acid, pentadecanoic acid, hexadecanoic acid, hexadecenoic acid, heptadecanoic acid, octadecanoic acid, octadecenoic acid, octadecadienoic acid, octadecanetrienoic acid, or the like. Further, from the viewpoint that it is possible to further stabilize a metal nanoparticle dispersion liquid, the average number of moles of added alkylene oxide is preferably 5 mol to 100 mol in the ethylene oxide, and is preferably 0 mol to 10 mol in the propylene oxide.

The fatty acid ester of an alcohol or of an alkylene oxide adduct of an alcohol may be a naturally occurring oil and fat, a hydrogenated oil or semihydrogenated oil thereof, or an alkylene oxide adduct of these. The oil and fat is favorably castor oil, peanut oil, olive oil, rapeseed oil, coconut oil, palm oil, palm kernel oil, beef tallow, mutton tallow, or the like. In particular, from the viewpoint that it is possible to further stabilize a metal nanoparticle dispersion liquid, the oil and fat is preferably castor oil.

From the viewpoint that it is possible to further stabilize a metal nanoparticle dispersion liquid, the phenol in the alkylene oxide adduct of a phenol is preferably tristyrenated phenol. Further, from the viewpoint that it is possible to further stabilize a metal nanoparticle dispersion liquid, the average number of moles of added alkylene oxide is preferably 5 mol to 40 mol in the ethylene oxide, and is preferably 0 mol to 10 mol in the propylene oxide. From the viewpoint that it is possible to further stabilize a metal nanoparticle dispersion liquid, the alcohol in the alkylene oxide adduct of an alcohol having 8 to 24 carbon atoms is preferably an aliphatic alcohol having 12 to 22 carbon atoms. Further, from the viewpoint that it is possible to further stabilize a metal nanoparticle dispersion liquid, the number of moles of added alkylene oxide is preferably 1 mol to 30 mol in the ethylene oxide, and is preferably 0 mol to 5 mol in the propylene oxide.

Further, one kind of the nonionic surfactant may be used alone, or two or more kinds thereof may be used in combination. In particular, from the viewpoint that it is possible to further stabilize a metal nanoparticle dispersion liquid, two or more kinds of the nonionic surfactant are preferably used in combination. For example, a combination of nonionic surfactants used together preferably includes a fatty acid ester of an alcohol or of an alkylene oxide adduct of an alcohol, and an alkylene oxide adduct of a phenol or of an alcohol having 8 to 24 carbon atoms.

Furthermore, the concentration of the nonionic surfactant contained in the second liquid L2 in a state of being dissolved or dispersed can be appropriately adjusted in accordance with the usage of the metal nanoparticle dispersion liquid and the like. For example, the concentration of the nonionic surfactant in a case where the nonionic surfactant is contained in the second liquid L2 in a state of being dissolved or dispersed may be within a range of 0.1% by mass or more and 10% by mass or less. Further, the concentration is preferably within a range of 0.1% by mass or more and 5% by mass or less.

(Regarding Controlling of Reaction Product)

In the present embodiment, it is possible to control the shape of the reaction product so that the reaction product has a spherical shape or the like, to control the reaction product to form a composite, or to control the size of the reaction product, by adjusting the potential difference between the nozzle 1 and the electrode 4, the gas flow rate of the gas outflow port 1b, the concentrations of the substances dissolved or dispersed in the metal-salt dissolution or dispersion liquid L1 and the second liquid L2 and associated with the reaction, the chemical interaction, or the like. The sizes of the metal nanoparticles generated by the reduction reaction depend on the sizes of the droplets of the metal-salt dissolution or dispersion liquid L1, the speed at which the droplets diffuse in the phase of the second liquid L2, and the speed of the reduction reaction. By taking into consideration that the size of the reaction product is to be decreased, in particular, that the sizes of the metal nanoparticles are on the order of nm, the droplets may have a particle diameter within a range of 0.1 µm or more and 100 µm or less. Further, the particle diameter is preferably within a range of 1 µm or more and 10 µm or less.

Accordingly, the type of the solvents as the metal-salt dissolution or dispersion liquid L1 and the second liquid L2, the amount of the droplets sprayed from the nozzle 1 (that is, the speed of feeding the metal-salt dissolution or dispersion liquid L1 from the supply source 2 to the nozzle 1), the type of the reducing agent, the distance between the spray port 1a of the nozzle 1 and the electrode 4, the distance between the spray port 1a of the nozzle 1 and the liquid surface of the second liquid L2, the gas flow rate of the gas outflow port 1b, the potential difference between the nozzle 1 and the electrode 4, and the like are adjusted. These adjustments make it possible to control the sizes of the droplets, and thereby control the size of the reaction product, particularly, the sizes of the metal nanoparticles. For example, the size of the reaction product such as metal nanoparticles can be controlled by controlling the sizes of the droplets through adjustment of at least one of properties of the metal-salt dissolution or dispersion liquid L1 such as surface tension, viscosity, relative permittivity, and ionic strength, the potential difference between the nozzle 1 and the electrode 4, and the gas flow rate of the gas outflow port 1b.

Incidentally, the surface tension of the metal-salt dissolution or dispersion liquid L1 is decreased so that the sizes of the droplets can be decreased. The ionic strength of the metal-salt dissolution or dispersion liquid L1 is decreased so that the sizes of the droplets can be decreased. The relative permittivity of the metal-salt dissolution or dispersion liquid L1 is decreased so that the sizes of the droplets can be decreased. Further, the potential difference between the nozzle 1 and the electrode 4 is increased so that the sizes of the droplets can be decreased. Further, the gas flow rate of the gas outflow port 1b is optimized so that the sizes of the droplets can be decreased. Decreasing the sizes of the droplets in this way makes it possible to decrease the sizes of the metal nanoparticles.

The distance between the spray port 1a of the nozzle 1 and the electrode 4 is favorably cm or more. Further, the distance is preferably 2 cm or more. A distance W1 between the spray port 1a of the nozzle 1 and the liquid surface of the second liquid L2 can be appropriately adjusted in accordance with the container capacity, the potential difference, and the like, and the distance W1 is preferably 1 cm or more and more preferably 2 cm or more. The upper limit of the distance W1 can be 20 cm by adjusting the potential, for example, in a case where a beaker has a capacity of 10 L, and can be appropriately adjusted in accordance with the container capacity, the potential difference, and the like.

The potential at the nozzle 1 side may be within a range of −30 kV or more and 30 kV or less, and the potential at the electrode 4 side may also be within a range of −30 kV or more and 30 kV or less. The potential difference between the nozzle 1 and the electrode 4 may be adjusted to be adequate for the reaction product to be obtained. For example, the potential difference between the nozzle 1 and the electrode 4 may be within a range of 0.3 kV or more and 30 kV or less when expressed as an absolute value. Further, by taking the stability of the reaction product and the like into consideration, the potential difference between the nozzle 1 and the electrode 4 is preferably 2.5 kV or more when expressed as an absolute value, and by taking the safety and cost of the apparatus into consideration, the potential difference is preferably 10 kV or less when expressed as an absolute value. The amount of the droplets sprayed from the nozzle 1 may be selected to be adequate for the reaction amount. For example, in a case where the reaction amount is 100 mL, the sprayed amount may be regulated such that the speed of feeding the metal-salt dissolution or dispersion liquid L1 is within a range of 0.001 mL/min (minute) or more and 0.1 mL/min or less.

The metal nanoparticle dispersion liquid can be subjected, as necessary, to various separation processes to reduce an excessive amount of the additive, and can also be subjected to condensation operation. As an ordinary process for the additive reduction and by-product salt removal, it is possible to employ centrifugation, ultrafiltration, ion exchange resin/membrane, or the like. The metal nanoparticle dispersion liquid thus obtained can be diluted or condensed to a predetermined concentration, and can be adjusted in accordance with the usage. Further, the metal nanoparticle dispersion liquid may contain other additives selected from a polymer resin dispersant, a pigment, a plasticizer, a stabilizer, an antioxidant, and the like, and a mixture of two or more kinds thereof, depending on the purpose.

As described above, in the manufacturing method and the manufacturing apparatus according to the present embodiment, the metal-salt dissolution or dispersion liquid L1 is electrostatically sprayed into the phase of the second liquid L2, the electrostatically sprayed metal-salt dissolution or dispersion liquid L1 reaches the phase of the second liquid L2, and the reaction product is dispersed in the phase of the second liquid L2. Therefore, almost all of the metal salt dissolved or dispersed in the electrostatically sprayed metal-salt dissolution or dispersion liquid L1 can react with the second liquid L2. Further, at least one of the properties of the first liquid and the second liquid L2, the electrostatic field, the gas flow rate, and the gas type is adjusted to control the properties of the droplets such that they are adequate for the reaction generating the metal nanoparticles, and thus it is possible to quickly stabilize the reaction product having desired properties, and to highly efficiently manufacture the metal nanoparticles of the reaction product. Therefore, this enables high-speed and highly-efficient manufacturing of the metal nanoparticles having a single nanometer size in which desired properties can be expected, as a catalyst or the like.

In the manufacturing method and the manufacturing apparatus according to the present embodiment, the sizes of the droplets are controlled by adjusting at least one of the surface tension, the ionic strength, and the relative permittivity of the metal-salt dissolution or dispersion liquid L1, the potential difference between the nozzle 1 and the electrode 4, and the gas flow rate of the gas outflow port. For this reason, it is possible to optimize the reaction conditions by precisely controlling the sizes of the droplets. Further, since the size of the reaction product is changed by the sizes of the droplets, precisely controlling the droplet sizes makes it possible to obtain metal nanoparticles having desired sizes.

The manufacturing method and the manufacturing apparatus according to the present embodiment enables high-speed and highly-efficient manufacturing of a dispersion of metal nanoparticles having a single nanometer size and desired properties in the phase of the second liquid in a case where the reducing agent or the surfactant is contained in the second liquid in a state of being dissolved or dispersed. Further, the surfactant is preferably a nonionic surfactant, and in this case, the metal nanoparticle dispersion liquid can be easily stabilized and the metal nanoparticle dispersion liquid can be easily condensed.

Second Embodiment

Figure 3:
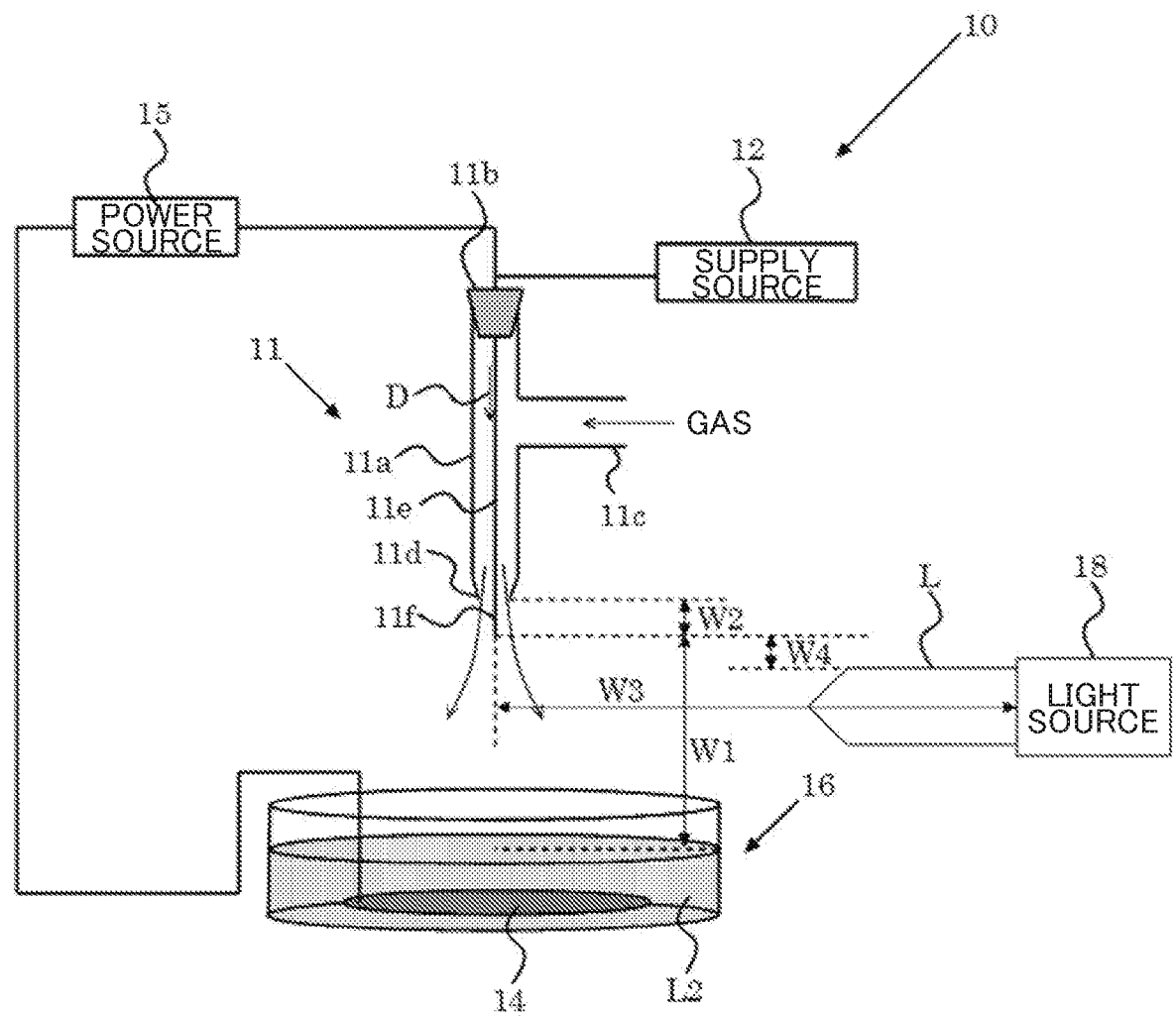
FIG. 3 is a schematic diagram illustrating a second embodiment of the apparatus for manufacturing metal nanoparticles of the present invention.

A second embodiment of a method and apparatus for manufacturing metal nanoparticle dispersion liquid according to the present invention will be described with reference to FIG. 3. FIG. 3 is a schematic diagram illustrating the second embodiment of an apparatus for manufacturing metal nanoparticles of the present invention. A manufacturing apparatus 10 of a metal nanoparticle dispersion liquid mainly includes a spraying unit 11, a power source 15 as a voltage applying unit, an electrode 14 as a potential difference forming means, and a light irradiating means 18. This second embodiment is different from the previous first embodiment in that the light irradiating means 18 is provided. Hereinafter, regardless of the duplicate description with respect to the first embodiment, the second embodiment will be described in detail. Further, the explanatory matters of the second embodiment can also be applied to the first embodiment unless otherwise specified.

The spraying unit 11 is configured as a unit spraying a metal-salt dissolution or dispersion liquid, and includes a gas flow feed pipe main body 11a, a sealing plug 11b, a gas introduction pipe 11c, a gas outflow port 11d, a liquid introduction pipe 11e, and a nozzle 11f.

The gas flow feed pipe main body 11a is a tubular body in which one end is sealed with the sealing plug 11b and the other end is opened as the gas outflow port 11d, and is configured such that the branch-shaped gas introduction pipe 11c is connected to the body portion. The liquid introduction pipe 11e is configured as a tubular body having a thinner diameter than the gas flow feed pipe main body 11a, and is disposed in a state where one end is connected to the supply source 12 of the metal-salt dissolution or dispersion liquid, the body portion is introduced into the gas flow feed pipe main body 11a and supported while the sealing plug 11b is penetrated therethrough, and the nozzle 11f at the other end protrudes from the gas outflow port 11d. Further, the liquid introduction pipe 11e is connected to the power source 15, the metal-salt dissolution or dispersion liquid sprayed from the nozzle 11f can be charged by applying a voltage from the power source 15. Incidentally, the gas flow feed pipe main body 11a, the gas introduction pipe 11c, and the liquid introduction pipe 11e of the spraying unit 11 can be configured by a stainless steel member or the like, and there is no need of expensive equipment.

A gas introduced from the gas introduction pipe 11c is not essential, but contributes to controlling of the sizes of the droplets of the metal-salt dissolution or dispersion liquid sprayed from the nozzle 11f when the gas flows out from the gas outflow port 11d. The gas is not particularly limited as long as it does not cause an unintentional reaction with respect to the metal nanoparticles which are dispersed in the metal nanoparticle dispersion liquid, and examples thereof include air, nitrogen, oxygen, carbon dioxide, sulfur hexafluoride ($SF_6$), and a mixed gas thereof. The pore diameter of the gas outflow port 11d is not particularly limited, but is preferably 2 mm to 20 mm. Further, a gas flow rate when the gas is introduced into the gas introduction pipe 11c is not particularly limited, but is preferably 0 L/min. to 10 L/min.

Herein, the metal-salt dissolution or dispersion liquid to be supplied from the supply source 12 is a liquid obtained by dissolving or dispersing a metal salt in a first liquid. As the metal salt, a salt of metal that becomes a metal nanoparticle raw material substance of the metal nanoparticle dispersion liquid to be manufactured is used. Such a metal salt is not particularly limited, and examples thereof include a salt containing one or two or more kinds of metals such as platinum, gold, silver, copper, tin, nickel, iron, palladium, zinc, cobalt, tungsten, ruthenium, indium, and molybdenum, and a complex salt of these metals. Further, a salt is not particularly limited, and examples thereof include a nitrate, a sulfate, and a hydrochloride.

The first liquid is not particularly limited as long as it is a liquid that can dissolve or disperse the metal salt, and examples thereof include water, ethanol, N,N-dimethylformamide (DMF), and acetone. Incidentally, one kind of these may be used alone, or two or more kinds thereof may be mixed and used. Further, in order to decrease the surface tension of the droplets sprayed from the nozzle 11f, the first liquid may be mixed with one or two or more kinds of a lower alcohol having 1 to 3 carbon atoms such as methanol, ethanol, or isopropyl alcohol, and a ketone such as acetone or methyl ethyl ketone.

The concentration of the metal salt in the metal-salt dissolution or dispersion liquid is not particularly limited, but is preferably 0.01 mol/L to 5 mol/L. When the concentration is less than 0.01 mol/L, the synthesis efficiency of the metal nanoparticles may deteriorate, and when the concentration is more than 5 mol/L, the metal nanoparticles may be enlarged.

The speed of feeding the metal-salt dissolution or dispersion liquid to the spraying unit 11 is not particularly limited, but is preferably 0.001 mL/min to 0.1 mL/min from the viewpoint of spraying fine droplets from the nozzle 11f.

The power source 15 is, as described above, connected to the liquid introduction pipe 11e and charges the metal-salt dissolution or dispersion liquid sprayed from the nozzle 11f. Further, the power source 15 is connected to the electrode 14. The electrode 14 is configured as a unit forming a potential difference between a second liquid L2 in which the metal-salt dissolution or dispersion liquid is dispersed and the charged metal-salt dissolution or dispersion liquid, spraying the metal-salt dissolution or dispersion liquid as droplets from the nozzle 11f of the spraying unit 11, and drawing the droplets in the second liquid L2. In the present embodiment, by disposing the electrode 14 connected to the power source 15 in the container 16 added with the second liquid L2, a potential difference is formed between the metal-salt dissolution or dispersion liquid and the second liquid L2, the metal-salt dissolution or dispersion liquid is sprayed as droplets from the nozzle 11f of the spraying unit 11, and the droplets are drawn to the second liquid L2.

The power source 15 is configured to apply a positive potential to the nozzle 11f and apply a negative potential to the electrode 14 or to apply a negative potential to the nozzle 11f and apply a positive potential to the electrode 14. Alternatively, the power source 15 is configured to apply a positive potential or a negative potential to one of the nozzle 11f and the electrode 14 and not to apply a voltage to the other one (to set a zero potential). The potential difference between the metal-salt dissolution or dispersion liquid and the second liquid L2 is not particularly limited, but is preferably 0.3 kV to 30 kV when expressed as an absolute value from the viewpoint of atomization of the droplets and stability in the dispersion liquid. Furthermore, the lower limit of the potential difference is preferably 2.5 kV or more from the viewpoint of further improving stability, and the upper limit thereof is preferably 10 kV or less from the viewpoint of safety of the manufacturing apparatus 10 and manufacturing cost.

The container 16 is disposed in a state where the electrode 14 is disposed on the bottom so that the liquid surface of the second liquid L2 to be accommodated faces the spray port of the nozzle 11f. Incidentally, the container 16 is opened at the side of the liquid surface of the second liquid L2, but may be configured to close the opening at times other than the manufacturing. The electrode 14 may have a plate shape as illustrated in FIG. 3, but may be a substantially ring shape, a substantially cylindrical shape, a substantially mesh shape, a substantially rod shape, a substantially spherical shape, a substantially hemispherical shape, or the like as long as an electrostatic field can be formed between the nozzle 11f and the electrode 14. Further, the electrode 14 is disposed on the bottom of the container 16, but in a case where the electrode 14 is formed in a substantially ring shape or a substantially cylindrical shape, the electrode 14 may be disposed along the circumferential direction of the container 16.

The second liquid L2 is not particularly limited, but is preferably a liquid that is miscible with the first liquid. Examples thereof include, similarly to the first liquid, water, ethanol, N,N-dimethylformamide (DMF), and acetone. Incidentally, one kind of these may be used alone, or two or more kinds thereof may be mixed and used.

The first liquid and the second liquid L2 are not particularly limited, but a reducing agent that reduces metal ions of the metal nanoparticles may be added. The reducing agent is not particularly limited, and examples thereof include hydroxymethanesulfinic acid, thioglycolic acid, sulfurous acid, or a salt thereof such as a sodium salt, a potassium salt, or an ammonium salt, ascorbic acid, citric acid, sodium hydrosulfite, thiourea, dithiothreitol, a hydrazine, a formaldehyde, and a boron hydride. Examples of the hydrazine include a hydrazine, a hydrazine hydrate, a hydrazine salt, a hydrazine substituent derivative or a salt thereof, and more specific examples thereof include a hydrazine hydrate, hydrazine monohydrochloride, hydrazine dihydrochloride, hydrazine sulfate, hydrazine bromate, hydrazine carbonate, methylhydrazine, phenylhydrazine, tert-butylhydrazine hydrochloride, and carbohydrazide. Further, examples of the formaldehyde include formaldehyde and paraformaldehyde. The boron hydride refers to a reducing compound having a boron-hydrogen bond, and specific examples thereof include sodium borohydride, potassium borohydride, lithium borohydride, sodium cyanotrihydroborate, lithium triethylborohydride, tetrahydrofuran-borane complex, dimethylamine-borane complex, diphenylamine-borane complex, and pyridine-borane complex. Among these, ascorbic acid and a hydrazine are preferable. Incidentally, one kind of these may be used alone or two or more kinds thereof may be used in combination.

The amount of the reducing agent added is preferably within a range of 1 to 2 times the chemical equivalent (stoichiometric amount, stoichiometry) necessary for reducing the metal ions. When the amount of the reducing agent added is less than 1 times the chemical equivalent, the reduction reaction may not proceed sufficiently, and when the amount of the reducing agent added is more than 2 times the chemical equivalent, the supply may become excessive to simply increase costs.

Further, as the second liquid L2, a dispersant as an auxiliary agent may be added. The dispersant is particularly useful in the case of selecting water as the second liquid L2. As the dispersant, a lower alcohol having 1 to 3 carbon atoms such as methanol, ethanol, or isopropyl alcohol, and a glycol ether solvent are exemplified. Incidentally, one kind of these may be used alone or two or more kinds thereof may be used in combination.

In the synthesis method for a metal nanoparticle dispersion liquid of the related art, a dispersant (protecting agent) for stabilizing the metal nanoparticles is generally used. Further, in the first embodiment, the dispersant (protecting agent) can be suitably used. However, when the dispersant (protecting agent) is used, activity of a catalyst or the like may deteriorate due to the influence of the remaining dispersant (protecting agent) on the surfaces of the metal nanoparticles. For this reason, in the second embodiment, unlike the first embodiment, the light irradiating means 18 is provided for the purpose of manufacturing metal nanoparticles without use of the dispersant.

The light irradiating means 18 is configured to be capable of irradiating the droplets of the metal-salt dissolution or dispersion liquid moving toward the second liquid L2 from the nozzle 11$f$ with light. As the light irradiating means 18, from the viewpoint of stably generating the metal nanoparticles, a means radiating light having a wavelength of 100 nm to 1,000 nm is preferable. Further, the cross-section of the irradiation light preferably has a height of about 5 cm and a width of about 10 cm.

In the manufacturing apparatus 10, the sizes of the metal nanoparticles in the metal nanoparticle dispersion liquid depend on the sizes of the droplets. Therefore, by taking the sizes (less than 10 nm) of the metal nanoparticles into consideration, the sizes of the droplets are preferably 0.1 µm to 100 µm and more preferably 1 µm to 10 µm in terms of diameter. Herein, the sizes of the droplets can be controlled by adjusting the type, the surface tension, the viscosity, the relative permittivity, and the ionic strength of the first liquid, the amount of the droplets sprayed from the nozzle 11$f$ (that is, the speed of feeding the metal-salt dissolution or dispersion liquid toward the nozzle 11$f$ from the supply source 12), the type of the reducing agent, the distance between the nozzle 11$f$ and the electrode 14, the distance between the nozzle 11$f$ and the surface of the second liquid L2, the gas flow rate at which the gas is introduced into the spraying unit 11, the potential difference between the nozzle 11$f$ and the electrode 14, and the like. Further, the sizes of the metal nanoparticles in the metal nanoparticle dispersion liquid depend on the intensity, the cross-sectional area, and the wavelength of irradiation light. Therefore, the sizes of the metal nanoparticles can be controlled by adjusting these.

Preferable dimensions in the manufacturing apparatus 10 will be described. A distance W1 between the nozzle 11$f$ and the liquid surface of the second liquid L2 is associated with an electric field strength therebetween, and is associated with atomization of the droplets generated by electrospray. The W1 is preferably 1 cm or more and more preferably 2 cm or more. Incidentally, the upper limit is about 20 cm. Further, a distance W2 between the gas outflow port 11$d$ and a tip end of the nozzle 11$f$ disposed to protrude from the gas outflow port 11$d$ is preferably about 2 mm. Further, a distance W3 between a line of the nozzle 11$f$ in an extension direction and a light source of the light irradiating means 18 is preferably about 10 cm. Further, a distance W4 between the tip end of the nozzle 11$f$ and the irradiation light is preferably about 0 cm to 5 cm in terms of the shortest distance with the irradiation light.

The method for manufacturing the metal nanoparticle dispersion liquid by the manufacturing apparatus 10 configured above will be described. First, the metal-salt dissolution or dispersion liquid obtained by dissolving or dispersing the metal salt in the first liquid is introduced into the supply source 12. Next, the second liquid L2 is introduced into the container 16. Next, light is radiated from the light irradiating means 18. Next, the power source of the power source 15 is turned on to form an electrostatic field between the nozzle 11$f$ and the second liquid L2. In these states, the supply of the metal-salt dissolution or dispersion liquid to the spraying unit 11 from the supply source 12 is started and the supply of the gas from the gas introduction pipe 11$c$ is started. The metal-salt dissolution or dispersion liquid is electrostatically sprayed in the form of droplets from the nozzle 11$f$ in a state where the metal-salt dissolution or dispersion liquid is charged by voltage application from the power source 15 and moves toward the second liquid L2. At this time, light is radiated from the light irradiating means 18 to the droplets moving toward the second liquid L2 from the nozzle 11$f$. The droplets which have been charged and irradiated with light are drawn towards the second liquid L2 and introduced into the second liquid L2. As described above, the metal nanoparticle dispersion liquid in which the droplets are dispersed in the second liquid L2 is manufactured.

Figure 4:
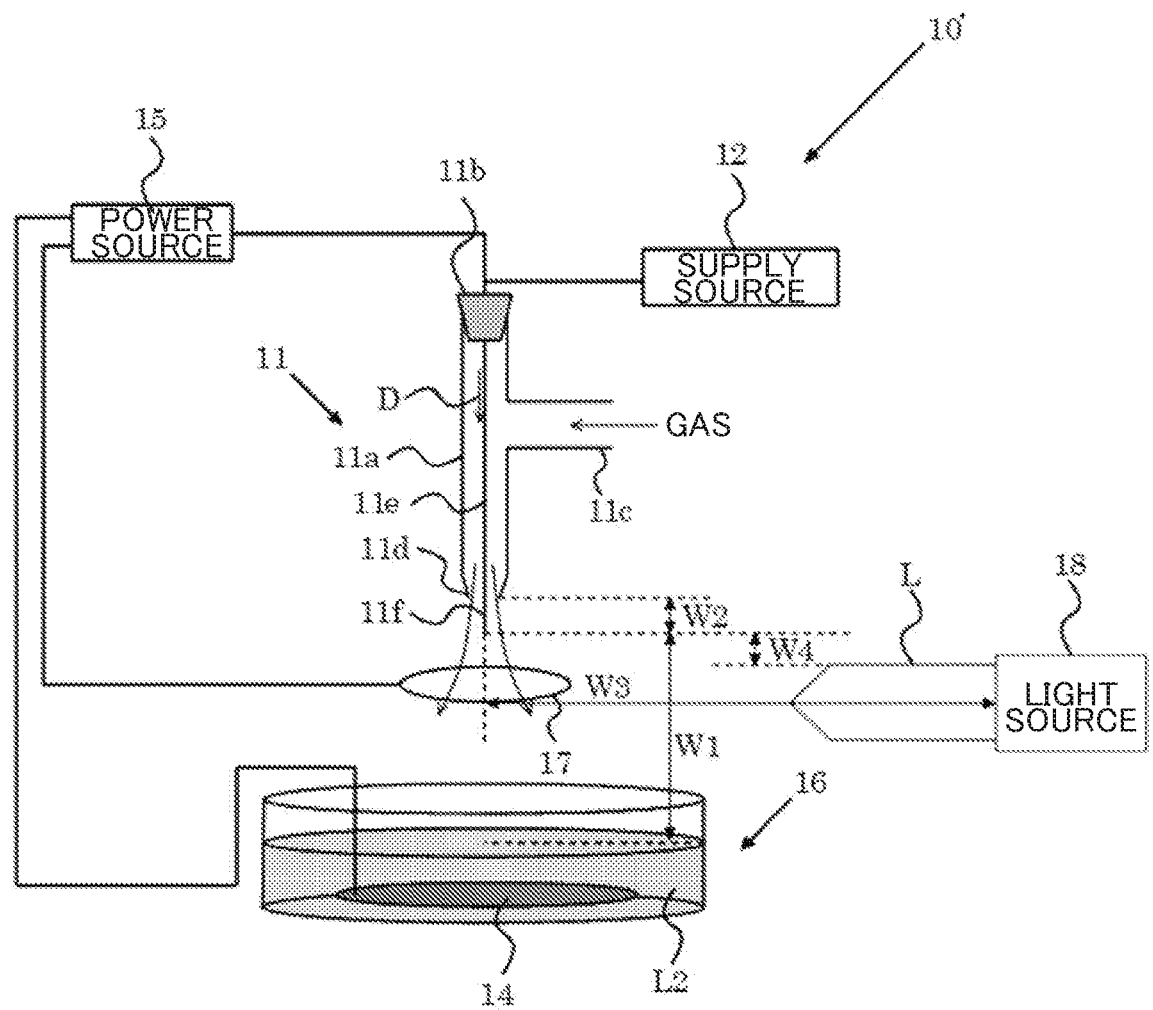
FIG. 4 is a schematic diagram illustrating a modified example of the second embodiment of the apparatus for manufacturing metal nanoparticles of the present invention.

Incidentally, the manufacturing apparatus 10 described above represents an embodiment of the apparatus for manufacturing a metal nanoparticle dispersion liquid according to the present invention, and the present invention is not limited to this embodiment. For example, as illustrated in FIG. 4, instead of the configuration in which a potential difference is applied between the nozzle 11$f$ and the electrode 14 of the manufacturing apparatus 10 illustrated in FIG. 4, a configuration like a manufacturing apparatus 10' may be employed in which a ring-shaped electrode 17 is disposed as a constituent of the spraying unit between the nozzle 11$f$ and the container 16, and a potential difference is applied between the ring-shaped electrode 17 and the electrode 14. Incidentally, FIG. 4 is a schematic diagram illustrating a modified example of the second embodiment of the apparatus for manufacturing metal nanoparticles of the present invention.

EXAMPLES

Hereinafter, the present invention will be described in more detail by means of Examples, but the present invention is not limited to these Examples.

Example 1

Figure 5:
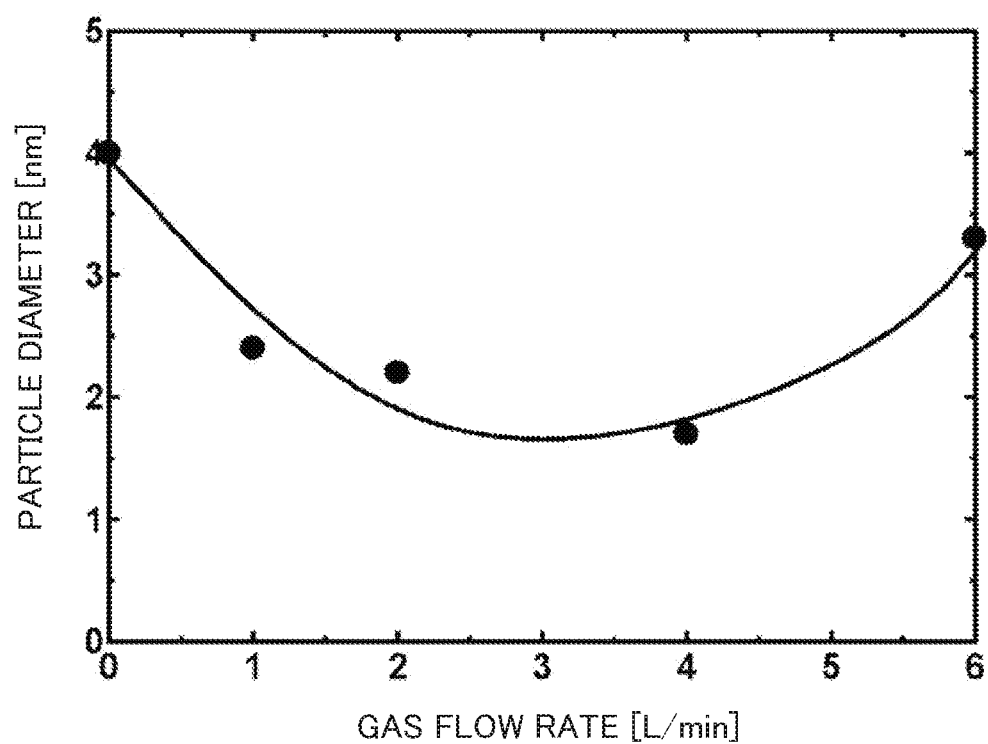
FIG. 5 is a diagram illustrating a relation between a flow rate of gas to be concurrently used in spraying and particle diameters of metal nanoparticles to be manufactured.
Figure 6:
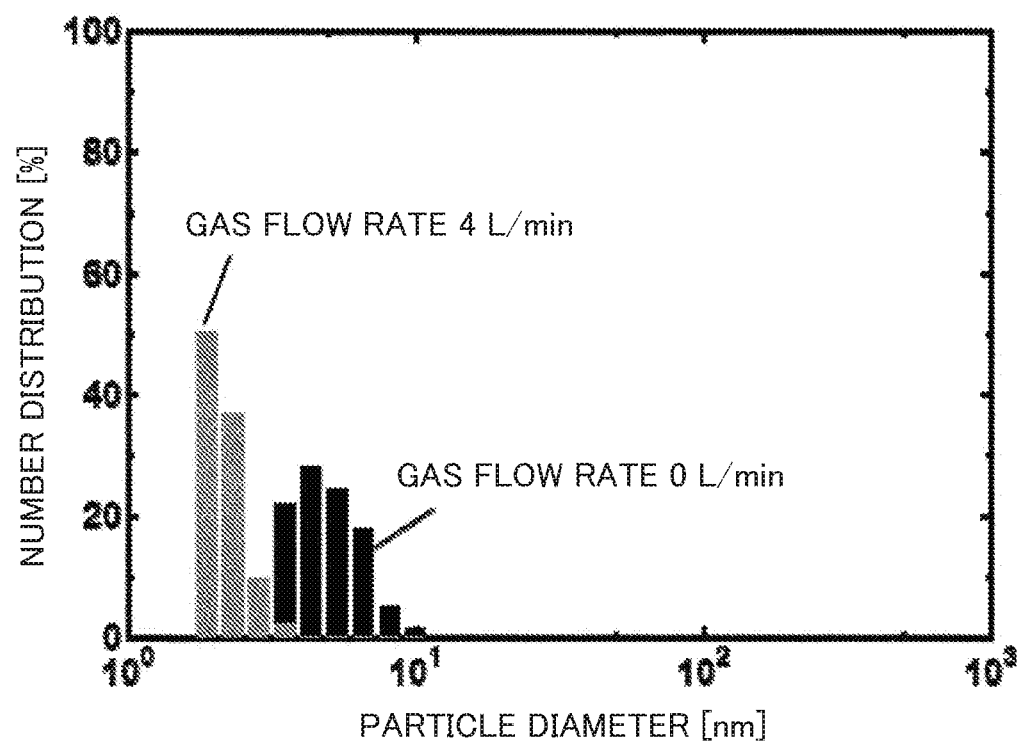
FIG. 6 is a diagram illustrating a relation between a flow rate of gas to be concurrently used in spraying and a particle size distribution of metal nanoparticles to be manufactured.

Gold nanoparticles were synthesized using an apparatus as schematically illustrated in FIG. 1 under the following conditions.
Applied voltage to nozzle: +7.5 kV
Metal-salt dissolution or dispersion liquid: methanol/chloroauric acid (0.05 mol/L)
Speed of feeding liquid: 0.02 mL/min.
Second liquid: water/PVP (1%)/hydrazine (0.15 mol/L), 50 cc
Container: inner diameter of 90 mm
Gas flow rate: 0 to 6 L/min.
Spraying time: 5 min The particle size distribution of the gold nanoparticles was measured by a dynamic light scattering method (Photal ELSZ-1000). The particle diameters of the gold nanoparticles at the time of gas flow rate change are illustrated in FIG. 5, and the particle size distributions at gas flow rates of 4 L/min and 0 L/min are illustrated in FIG. 6. The particle diameter in FIG. 5 indicates a particle diameter having a peak value of the number distribution in the particle size distribution measured by the measurement apparatus. As illustrated in FIG. 5, it is found that gold nanoparticles having a particle diameter of about 1.5 nm are intensively synthesized at a gas flow rate of 4 L/min and the particle diameter can be controlled with extremely high accuracy. Further, it is indicated that the particle diameters of the gold nanoparticles can be controlled by the gas flow rate. Since all the sprayed droplets are collected in the container, the gold nanoparticles can be obtained with a high collection rate of 99% or more.

Example 2

Figure 7:
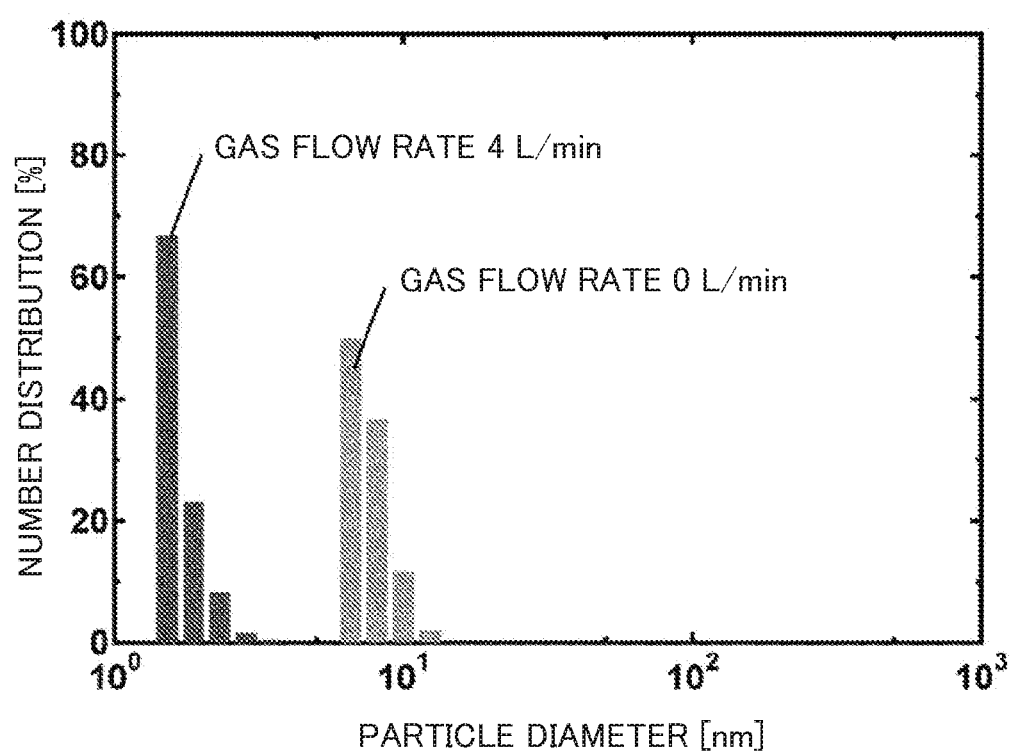
FIG. 7 is a diagram illustrating a relation between presence/absence of gas to be concurrently used in spraying and a particle size distribution of metal nanoparticles to be manufactured.

Gold nanoparticles were synthesized using an apparatus as schematically illustrated in FIG. 1 while the speed of feeding the liquid was set to 10 times the speed of feeding the liquid in Example 1.
Applied voltage to nozzle: +7.5 kV
Metal-salt dissolution or dispersion liquid: methanol/chloroauric acid (0.05 mol/L)
Speed of feeding liquid: 0.2 mL/min
Second liquid: water/PVP (1%)/hydrazine (0.15 mol/L), 50 cc
Container: inner diameter of 90 mm
Gas flow rate: 0 or 4 L/min
Spraying time: 5 min The particle size distribution of the gold nanoparticles was measured by a dynamic light scattering method. The particle size distributions of the gold nanoparticles in the case of gas flow rates of 0 L/min and 4 L/min are illustrated in FIG. 7. It is found that the sizes of the gold nanoparticles at a gas flow rate of 0 L/min are about 10 nm, and the gold nanoparticles having a particle diameter of about 1.5 nm are synthesized at a gas flow rate of 4 L/min. This indicates that metal particles having a single nanometer size can be stably synthesized by the gas flow effect even at higher speed of feeding the liquid than that of the related art.

Example 3

Figure 8:
FIG. 8 is a view showing second liquids containing metal nanoparticles manufactured in an example and a comparative example. The left view is an example using electrospray at an applied voltage of 7.5 kV. The right view is a comparative example not using electrospray at an applied voltage of 0 kV.

Gold nanoparticles were synthesized using an apparatus as schematically illustrated in FIG. 1 under the following conditions.
Applied voltage to nozzle: +7.5 or 0 kV
Metal-salt dissolution or dispersion liquid: methanol/chloroauric acid (0.05 mol/L)
Speed of feeding liquid: 0.02 mL/min
Second liquid: water/citric acid (1%), 50 cc
Container: inner diameter of 90 mm
Gas flow rate: 4 L/min
Spraying time: 5 min The particle size distribution of the gold nanoparticles was measured by a dynamic light scattering method. It was confirmed that the gold nanoparticles having a particle diameter of about 4 nm were synthesized in the case of an applied voltage of 7.5 kV. On the other hand, it was confirmed that the gold nanoparticles having a particle diameter of 60 nm were synthesized in the case of an applied voltage of 0 kV. FIG. 8 is a photograph of a gold nanoparticle solution after one month from the synthesis of gold nanoparticles. The gold nanoparticles are aggregated at an applied voltage of 0 kV and precipitated, so that the color of the solution is transparent. On the other hand, since there is no change in color of the solution even after one month in the case of the applied voltage of 7.5 kV, it is found that the gold nanoparticles are not aggregated and are stably dispersed. As one of factors for this, electrostatic repulsion between particles generated in the liquid by charging of the droplets by electrospray is exemplified.

Example 4

Ruthenium nanoparticles were synthesized using an apparatus as schematically illustrated in FIG. 1 under the following conditions.
Applied voltage to nozzle: +7.5 kV
Metal-salt dissolution or dispersion liquid: methanol/ruthenium chloride (0.05 mol/L)
Speed of feeding liquid: 0.2 mL/min
Second liquid: water/PVP (1%)/hydrazine (0.15 mol/L), 50 cc
Container: inner diameter of 90 mm
Gas flow rate: 4 L/min
Spraying time: 5 min The particle size distribution of the ruthenium nanoparticles was measured by a dynamic light scattering method. From the particle size distribution measurement result of the ruthenium nanoparticles, it was confirmed that the ruthenium nanoparticles having a particle diameter of about 6 nm were intensively synthesized.

Example 5

A gold nanoparticle dispersion liquid according to Example 5 was manufactured as follows using the manufacturing apparatus 10 illustrated in FIG. 3.

First, a metal-salt dissolution or dispersion liquid obtained by dissolving chloroauric acid as the metal salt in a methanol solution as the first liquid at a concentration of 0.05 mol/L was prepared. Next, a voltage of +7.5 kV was applied to the metal-salt dissolution or dispersion liquid by the power source 15 while the metal-salt dissolution or dispersion liquid was supplied from the supply source 12 to the spraying unit 11 at the speed of feeding the liquid of 0.01 mL/min. At the same time, the electrode 14 as the potential difference forming means was grounded (0 kV), the metal-salt dissolution or dispersion liquid was sprayed as the droplets from the nozzle 11*f*, and the droplets were drawn and introduced in the container 16 added with 50 cc of water as the second liquid. At this time, the condition of the gas flow rate to the spraying unit 11 was 2 L/min and the spraying time was set to 5 minutes. Further, the droplets moving toward the second liquid from the nozzle 11*f* was irradiated with light using an ultra-high pressure mercury lamp (UI-501C) as a light source. As described above, the gold nanoparticle dispersion liquid according to Example 5 was manufactured.

Reference Example 1

A gold nanoparticle dispersion liquid according to Reference Example 1 was manufactured in the similar manner to Example 5, except that light was not radiated from the light source.

Reference Example 2

A gold nanoparticle dispersion liquid according to Reference Example 2 was manufactured in the similar manner to Example 1, except that the droplets moving toward the second liquid from the nozzle 11*f* were not irradiated with light, and the second liquid in a state where the droplets are introduced was irradiated with light using an ultra-high pressure mercury lamp (UI-501C) as a light source for 30 seconds.

Reference Example 3

A gold nanoparticle dispersion liquid according to Reference Example 3 was manufactured in the similar manner to Reference Example 2, except that the irradiation time of light was changed from 30 seconds to 1 minute.

Figure 9:
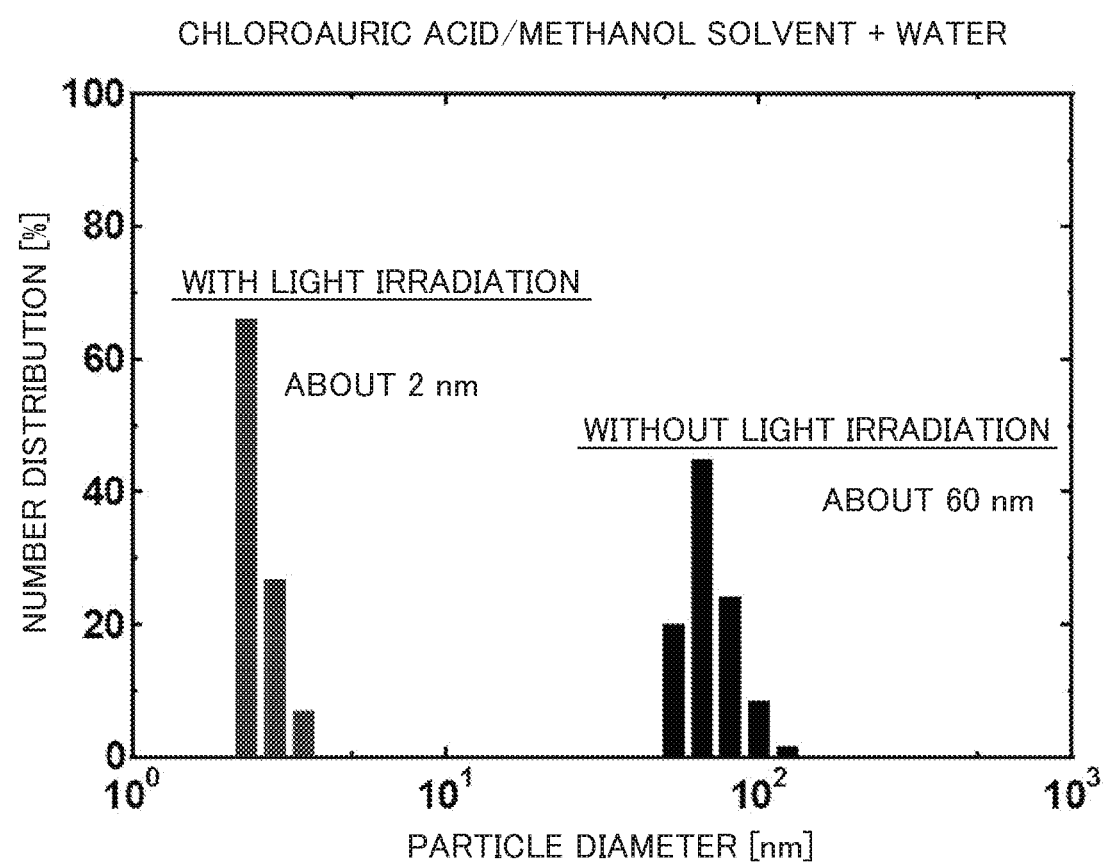
FIG. 9 is a diagram illustrating the particle size distribution of gold nanoparticles.

Regarding the respective gold nanoparticle dispersion liquids according to Example 5 and Reference Example 1, the particle size distribution of the gold nanoparticles was measured by a dynamic light scattering method (Photal ELSZ-1000). The measurement result is presented in FIG. 9. Incidentally, FIG. 9 is a diagram illustrating the particle size distribution of the gold nanoparticles. Further, the measurement result is data obtained after four days from manufacturing for the purpose of confirming a temporal change in aggregation of the gold nanoparticles or the like. As illustrated in FIG. 9, the particle diameters of the gold nanoparticles in the gold nanoparticle dispersion liquid according to Example 5 were about 2 nm. On the other hand, the particle diameters of the gold nanoparticles in the gold nanoparticle dispersion liquid according to Reference Example 1 were about 60 nm, so that it was not possible to obtain the gold nanoparticles having a particle diameter of less than 10 nm.

Figure 10:
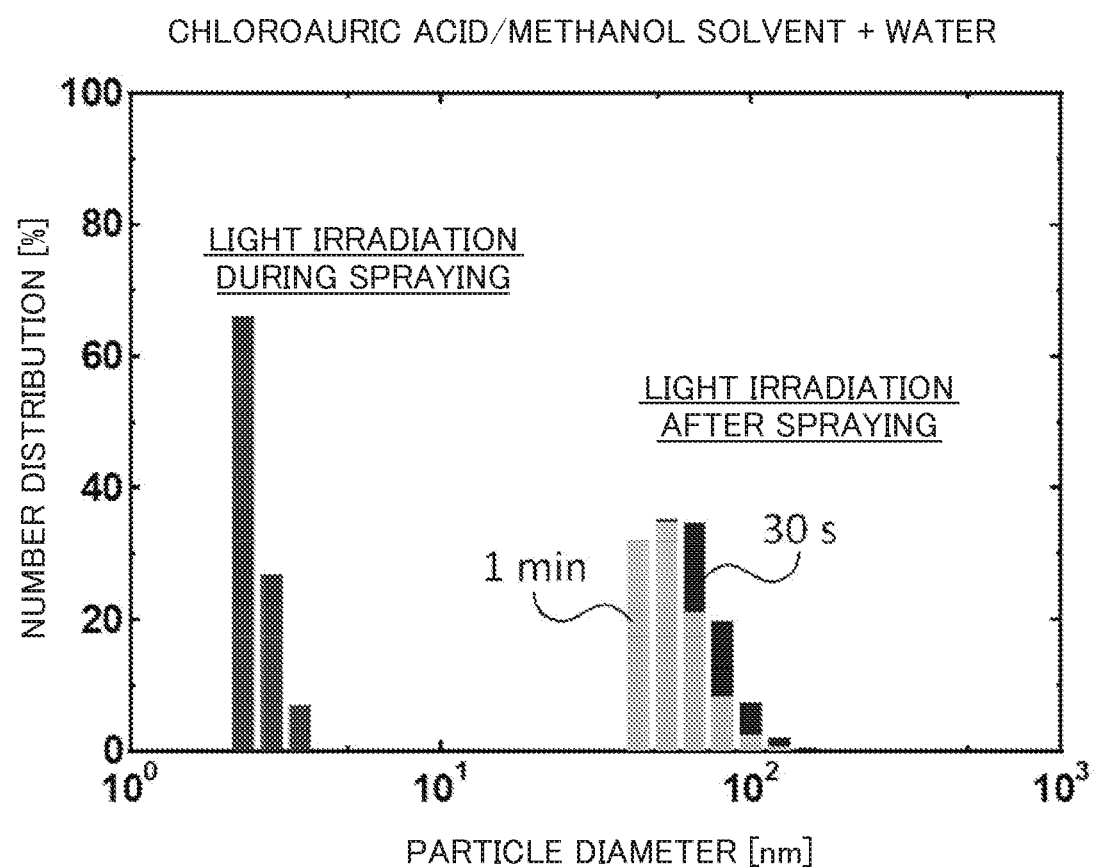
FIG. 10 is a diagram illustrating the particle size distribution of the gold nanoparticles.

Further, regarding the respective gold nanoparticle dispersion liquids according to Reference Examples 2 and 3, the particle size distribution of the gold nanoparticles was measured by the similar method to the measurement method of the respective gold nanoparticle dispersion liquids according to Example 5 and Reference Example 1. The measurement result is presented in FIG. 10. Incidentally, FIG. 10 is a diagram illustrating the particle size distribution of the gold nanoparticles. As illustrated in FIG. 10, the particle diameters of the gold nanoparticles in the respective gold nanoparticle dispersion liquids according to Reference Examples 2 and 3 were also about 60 nm which are almost unchanged from the particle diameters of the gold nanoparticles in the gold nanoparticle dispersion liquid according to Reference Example 1. From the above result, it was confirmed that metal nanoparticles having a particle diameter of less than 10 nm can be formed by irradiating the droplets moving toward the second liquid from the nozzle 11*f* with light. Incidentally, from the results of Examples 1 to 3, even under the manufacturing conditions of Reference Examples 1 to 3, metal nanoparticles having a particle diameter of less than 10 nm can be formed by using a dispersant such as polyvinylpyrrolidone (PVP) or citric acid.

Example 6

A gold nanoparticle dispersion liquid according to Example 6 was manufactured in the similar manner to Example 5, except that methanol as the first liquid was changed to the same type of water as the second liquid.

Reference Example 4

A gold nanoparticle dispersion liquid according to Reference Example 4 was manufactured in the similar manner to Example 6, except that light was not radiated from the light source.

Figure 11:
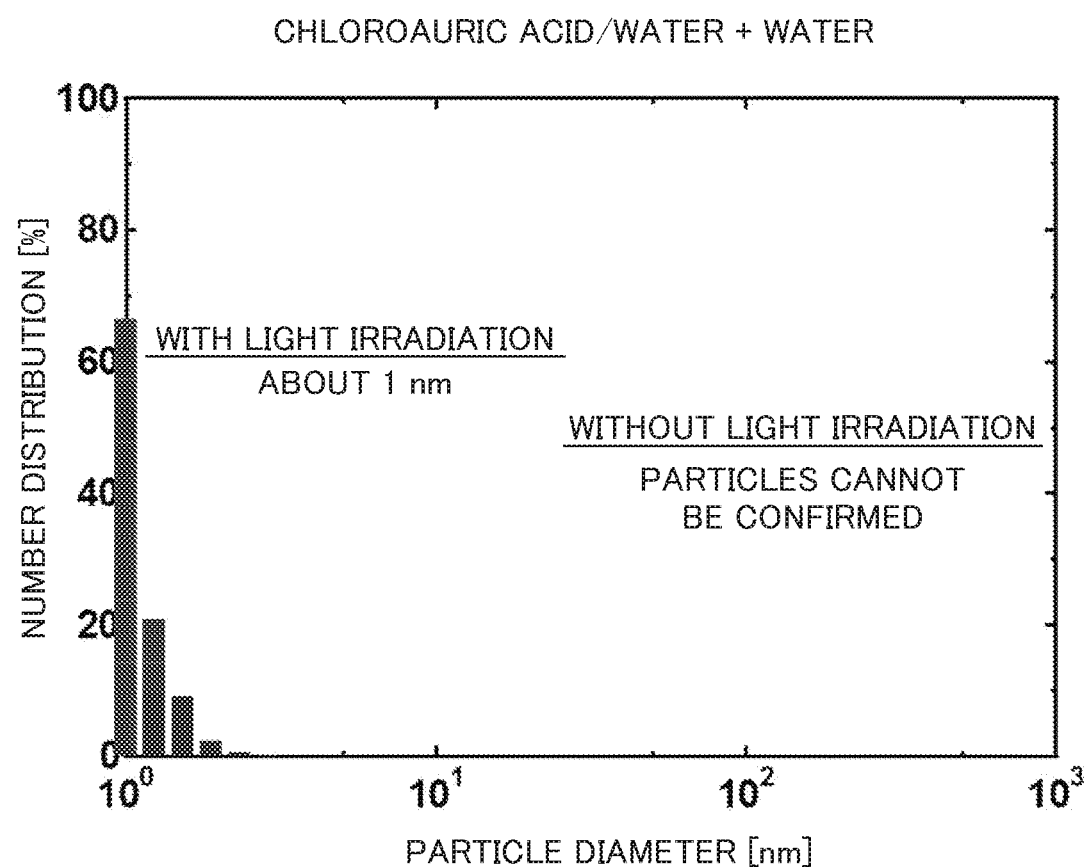
FIG. 11 is a diagram illustrating the particle size distribution of the gold nanoparticles.

Regarding the respective gold nanoparticle dispersion liquids according to Example 6 and Reference Example 4, the particle size distribution of the gold nanoparticles was measured by the similar method to the measurement method of the respective gold nanoparticle dispersion liquids according to Example 5 and Reference Example 1. The measurement result is presented in FIG. 11. Incidentally, FIG. 11 is a diagram illustrating the particle size distribution of the gold nanoparticles. Further, the measurement result is data obtained immediately after manufacturing. As illustrated in FIG. 11, the particle diameters of the gold nanoparticles in the gold nanoparticle dispersion liquid according to Example 6 were about 1 nm. On the other hand, in the gold nanoparticle dispersion liquid according to Reference Example 4, it was not possible to confirm the generation of gold particles. From the above results, it is found that irradiation of the droplets moving toward the second liquid from the nozzle 11*f* with light has an important role in generation of metal nanoparticles. Incidentally, from the results of Examples 1 to 3, even under the manufacturing condition of Reference Example 4, metal nanoparticles having a particle diameter of less than 10 nm can be formed by using a dispersant such as polyvinylpyrrolidone (PVP) or citric acid.

Through comparison between the respective gold nanoparticle dispersion liquids according to Examples 5 and 6 and the respective gold nanoparticle dispersion liquids according to Reference Examples 1 to 4, it is confirmed that by irradiating the droplets moving toward the second liquid from the spraying unit 11 with light, gold nanoparticles having a particle diameter of less than 10 nm are generated from gold particles or gold ions contained in the droplets. As a factor that such gold nanoparticles are generated, an interface reaction between active species in the air generated by irradiation light and the droplets and photoreduction action in the droplets are assumed.

Figure 12:
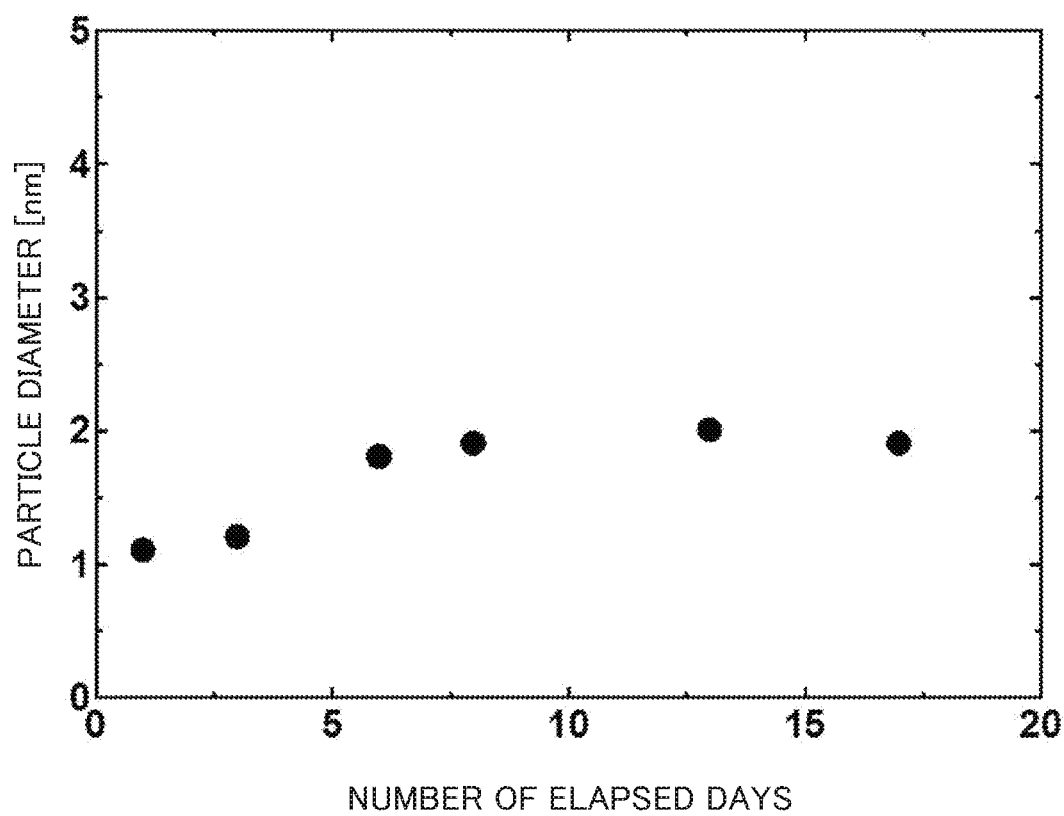
FIG. 12 is a diagram illustrating a relation between the number of elapsed days after manufacturing a gold nanoparticle dispersion liquid and a particle diameter of metal nanoparticles.

Further, FIG. 12 is a diagram illustrating a relation between the number of elapsed days after manufacturing a metal nanoparticle dispersion liquid and a particle diameter of metal nanoparticles. Incidentally, the term "particle diameter" in FIG. 12 refers to a particle diameter having a peak value in the number distribution. As illustrated in FIG. 12, in the gold nanoparticle dispersion liquid according to Example 6, it is found that the particle diameter is about 2 nm even after about 20 days have elapsed from manufacturing and the aggregation of the particles is suppressed although a dispersant (protecting agent) is not used. As a factor that such a result is obtained, it is assumed that the particles in the liquid are electrostatically repulsed as a result of introducing the droplets in a state of being charged into the second liquid, and thus the aggregation of the particles is suppressed.

Example 7

A gold nanoparticle support according to Example 7 was manufactured by mixing silica powder as a support supporting gold nanoparticles in the gold nanoparticle dispersion liquid according to Example 6, stirring the mixture, and performing centrifugation to the mixture.

Example 8

A gold nanoparticle support according to Example 8 was manufactured in the similar manner to Example 7, except that activated carbon powder was mixed instead of silica powder.

Figure 13:
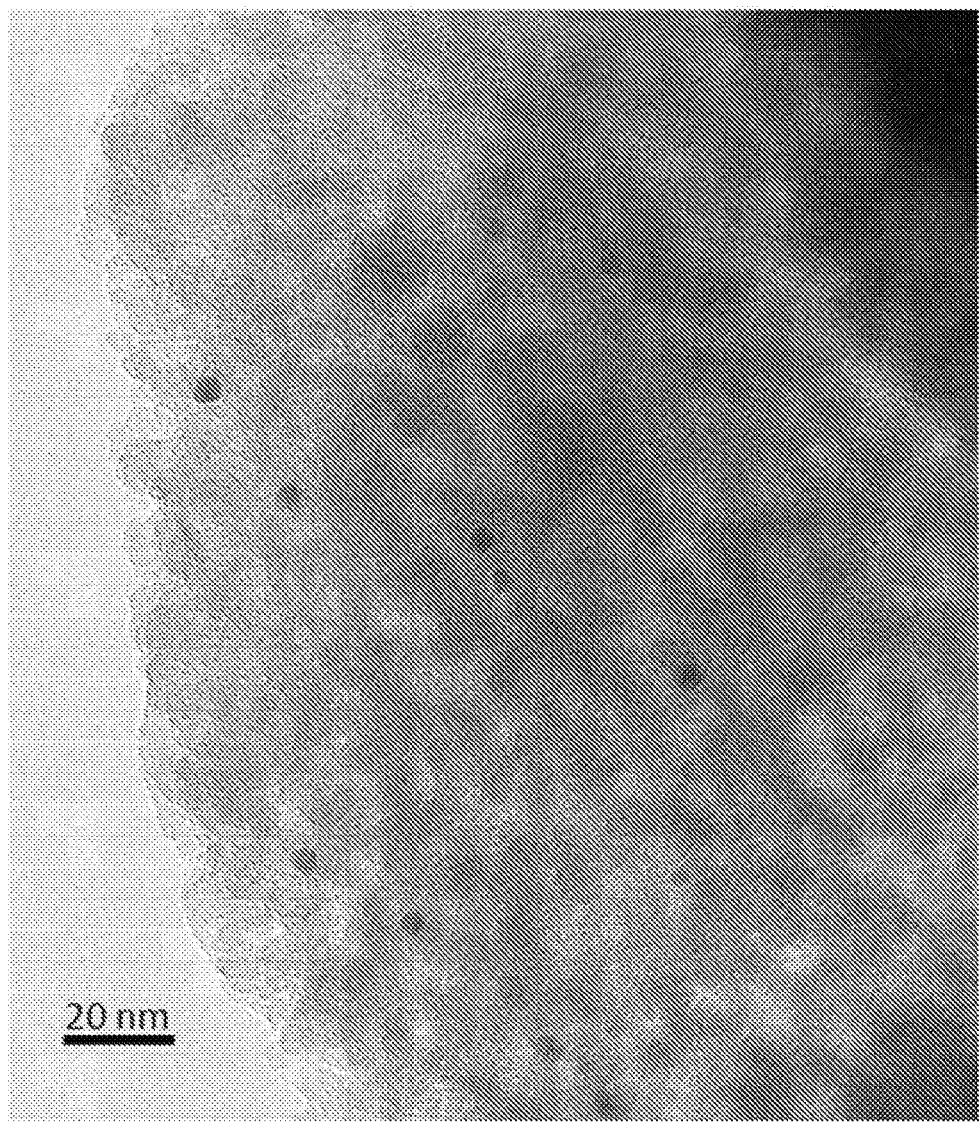
FIG. 13 is a view showing a TEM photograph of silica supporting gold nanoparticles.
Figure 14:
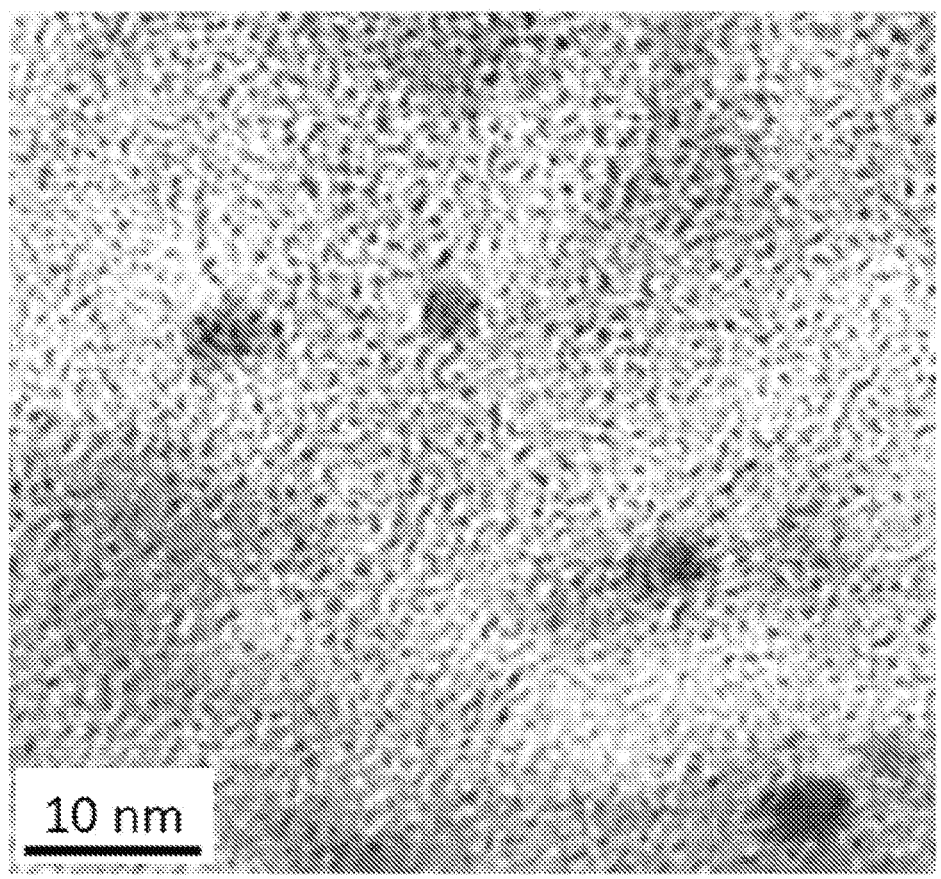
FIG. 14 is a view showing a TEM photograph of activated carbon supporting gold nanoparticles.

FIGS. 13 and 14 show TEM images of these gold nanoparticle supports. Incidentally, FIG. 13 is a view showing a TEM photograph of silica having gold nanoparticles supported thereon, and FIG. 14 is a view showing a TEM photograph of activated carbon having gold nanoparticles supported thereon. As shown in FIGS. 13 and 14, it is shown that both silica and activated carbon have a particle diameter of 5 nm or less and gold nanoparticles are supported by these supports. Further, in the respective manufactured supports, since a dispersant (protecting agent) is not used with respect to the gold nanoparticles to be supported, there is no problem of the remaining dispersant (protecting agent) on the surfaces of the gold nanoparticles and high catalyst activity can be expected. Incidentally, although the metal nanoparticles are supported by silica and activated carbon in Examples 7 and 8, the support is not limited thereto and may be alumina, zeolite, paper, fiber, membrane, non-woven fabric, cloth, foam, and the like.

As described above, according to the apparatus and method for manufacturing metal nanoparticles according to the second embodiment in which droplets are irradiated with light (see FIG. 3 and the like), metal nanoparticles having a particle diameter of less than 10 nm and formed only from metal are obtained. That is, metal nanoparticles whose particle surfaces are not covered with the remaining dispersant (protecting agent) and which are in a state where the metal surfaces of the particles are exposed are obtained. Further, a metal nanoparticle dispersion liquid which contains the metal nanoparticles in that state and the second liquid in which the metal-salt dissolution or dispersion liquid is dispersed is obtained. Incidentally, the metal nanoparticles and the second liquid can be separated by vaporizing the second liquid from the metal nanoparticle dispersion liquid. Further, since the remaining dispersant (protecting agent) does not exist on the particle surface and the heating treatment at a high temperature (200° C. to 300° C.) for removing the remaining dispersant (protecting agent) does not need to be performed, it is possible to obtain a metal nanoparticle support having the metal nanoparticles supported on an arbitrary support (for example, silica powder or activated carbon powder) without limitation due to such heating conditions.

INDUSTRIAL APPLICABILITY

According to the method and apparatus for manufacturing metal nanoparticles of the present invention, it is possible to manufacture metal nanoparticles having a single nanometer size and a relatively uniform particle diameter, and thus it can be expected that the method and apparatus for manufacturing metal nanoparticles of the present invention are used in manufacturing of high-performance catalyst particles in various reactions.

EXPLANATION OF REFERENCE NUMERALS

1: Nozzle (electrospray nozzle)
1a: Spray port 1b: Gas outflow port
2: Supply source (of metal-salt dissolution or dispersion liquid)
3: Supply pipe (of metal-salt dissolution or dispersion liquid)
4: Electrode (potential difference forming means)
5: Power source (voltage applying unit)
6: Container
7: Electrode
D: Movement direction (of metal-salt dissolution or dispersion liquid)
L1: Metal-salt dissolution or dispersion liquid
L2: Second liquid
W1: Distance between spray port 1a and surface of second liquid L2 (FIGS. 1 and 2)
W2: Distance between spray port 1a and gas outflow port 1b (FIGS. 1 and 2)
10, 10': Manufacturing apparatus
11: Spraying unit
11a: Gas flow feed pipe main body
11b: Sealing plug
11c: Gas introduction pipe
11d: Gas outflow port
11e: Liquid introduction pipe
11f: Nozzle
12: Supply source
14: Electrode (potential difference forming means)
15: Power source (voltage applying unit)
16: Container
17: Ring-shaped electrode
18: Light irradiating means
W1: Distance between nozzle 11f and liquid surface of second liquid L2 (FIGS. 3 and 4)
W2: Distance between gas outflow port 11d and tip end of nozzle 11f disposed to protrude from gas outflow port 11d (FIGS. 3 and 4)
W3: Distance between line of nozzle 11f in extension direction and light source of light irradiating means 18
W4: Distance between tip end of nozzle 11f and irradiation light
L: Irradiation light

The invention claimed is:
1. A method for manufacturing a metal nanoparticle dispersion liquid, the method comprising:
dissolving or dispersing a metal salt in a first liquid to obtain a metal-salt dissolution or dispersion liquid;
feeding the metal-salt dissolution or dispersion liquid to a spraying unit;

applying a voltage to the spraying unit to charge the metal-salt dissolution or dispersion liquid;

forming a potential difference between a second liquid and the charged metal-salt dissolution or dispersion liquid, wherein the second liquid is in a container having a cavity formed therein, while concurrently spraying the metal-salt dissolution or dispersion liquid as droplets from the spraying unit with a gas flow;

drawing the droplets to the second liquid so as to allow the droplets to mix and react with the second liquid to obtain a metal nanoparticle dispersed as a reaction product in the second liquid; and collecting the metal nanoparticle from the second liquid.

2. The method for manufacturing a metal nanoparticle dispersion liquid according to claim 1, wherein the second liquid contains a reducing agent.

3. The method for manufacturing a metal nanoparticle dispersion liquid according to claim 1, wherein the second liquid contains a dispersant.

4. The method for manufacturing a metal nanoparticle dispersion liquid according to claim 1, further comprising irradiating the droplets moving toward the second liquid from the spraying unit with light.

5. A method for manufacturing a composition comprising metal nanoparticles supported on a metal nanoparticle support, the metal nanoparticle support being a support for supporting metal nanoparticles, the method comprising: dispersing the metal nanoparticle support into the metal nanoparticle dispersion liquid manufactured by the method for manufacturing a metal nanoparticle dispersion liquid according to claim 1.

6. The method for manufacturing a metal nanoparticle dispersion liquid according to claim 1, wherein the container has a bottom portion and wherein the step of forming a potential difference uses: an electrode in contact with the bottom portion of the container, an electrode disposed apart from the bottom of the container, or an electrode disposed between the spraying unit and the container.

* * * * *